United States Patent
D'Souza et al.

(10) Patent No.: US 8,271,436 B2
(45) Date of Patent: Sep. 18, 2012

(54) RETRO-FITTING SYNTHETIC FULL COPIES OF DATA

(75) Inventors: Roy P. D'Souza, Santa Clara, CA (US); T. M. Ravi, Santa Clara, CA (US)

(73) Assignee: Mimosa Systems, Inc., Santa Clara, CA (US)

( * ) Notice: Subject to any disclaimer, the term of this patent is extended or adjusted under 35 U.S.C. 154(b) by 604 days.

(21) Appl. No.: 11/541,857

(22) Filed: Oct. 2, 2006

(65) Prior Publication Data

US 2007/0233756 A1  Oct. 4, 2007

Related U.S. Application Data

(63) Continuation-in-part of application No. 11/500,809, filed on Aug. 7, 2006, which is a continuation-in-part of application No. 11/211,056, filed on Aug. 23, 2005, now Pat. No. 7,778,976.

(60) Provisional application No. 60/650,556, filed on Feb. 7, 2005.

(51) Int. Cl.
*G06F 17/30* (2006.01)

(52) U.S. Cl. .................................................. 707/611

(58) Field of Classification Search .................. 707/611
See application file for complete search history.

(56) References Cited

U.S. PATENT DOCUMENTS

| | | | | |
|---|---|---|---|---|
| 4,914,586 A * | 4/1990 | Swinehart et al. | ..................... | 1/1 |
| 5,287,501 A * | 2/1994 | Lomet | ........................... | 707/648 |
| 5,418,940 A * | 5/1995 | Mohan | ......................... | 714/5.11 |
| 5,574,897 A * | 11/1996 | Hermsmeier et al. | ................. | 1/1 |
| 5,625,820 A * | 4/1997 | Hermsmeier et al. | ................. | 1/1 |
| 5,689,698 A | 11/1997 | Jones et al. | | |
| 5,706,510 A * | 1/1998 | Burgoon | ............................... | 1/1 |
| 5,721,916 A * | 2/1998 | Pardikar | ....................... | 707/201 |
| 5,870,763 A * | 2/1999 | Lomet | ................... | 1/1 |
| 5,933,838 A * | 8/1999 | Lomet | ................... | 1/1 |
| 5,946,698 A * | 8/1999 | Lomet | ................... | 1/1 |
| 5,950,212 A * | 9/1999 | Anderson et al. | ..................... | 1/1 |
| 5,966,706 A * | 10/1999 | Biliris et al. | .......................... | 1/1 |
| 5,974,563 A | 10/1999 | Beeler, Jr. | | |
| 6,006,342 A * | 12/1999 | Beardsley et al. | ................. | 714/5 |
| 6,014,674 A * | 1/2000 | McCargar | ............................. | 1/1 |
| 6,067,550 A * | 5/2000 | Lomet | ................... | 1/1 |
| 6,094,654 A | 7/2000 | Van Huben et al. | | |
| 6,148,410 A | 11/2000 | Baskey et al. | | |
| 6,151,607 A * | 11/2000 | Lomet | ................... | 1/1 |
| 6,182,086 B1 * | 1/2001 | Lomet et al. | .......................... | 1/1 |
| 6,185,699 B1 * | 2/2001 | Haderle et al. | ................... | 714/19 |
| 6,226,651 B1 * | 5/2001 | Masuda et al. | ................ | 707/202 |

(Continued)

OTHER PUBLICATIONS

Rosenblum, M. and Ousterhout, J. K. 1992. The design and implementation of a log-structured file system. ACM Trans. Comput. Syst. 10, 1 (Feb. 1992), 26-52. DOI= http://doi.acm.org/10.1145/146941.146943.*

(Continued)

*Primary Examiner* — Mark A Radtke
(74) *Attorney, Agent, or Firm* — Gregory & Sawrie LLP

(57) ABSTRACT

Multi-dimensional surrogation systems and methods are provided that generate at least one data surrogate using information of data and numerous data changes received from at least one data source. Embodiments described herein perform shadowing of production server databases, including creation of synthetic fulls by retrofitting log shipping to enterprise database systems, or other systems, that do not have log shipping capabilities.

46 Claims, 10 Drawing Sheets

U.S. PATENT DOCUMENTS

| | | | |
|---|---|---|---|
| 6,240,414 B1 | 5/2001 | Beizer et al. | |
| 6,249,879 B1 | 6/2001 | Walker et al. | |
| 6,253,230 B1 | 6/2001 | Couland et al. | |
| 6,256,773 B1* | 7/2001 | Bowman-Amuah | 717/121 |
| 6,260,129 B1* | 7/2001 | Crockett et al. | 711/170 |
| 6,338,146 B1* | 1/2002 | Johnson et al. | 714/4.5 |
| 6,385,706 B1* | 5/2002 | Ofek et al. | 711/162 |
| 6,397,308 B1* | 5/2002 | Ofek et al. | 711/162 |
| 6,434,568 B1 | 8/2002 | Bowman-Amuah | |
| 6,477,580 B1 | 11/2002 | Bowman-Amuah | |
| 6,487,561 B1* | 11/2002 | Ofek et al. | 1/1 |
| 6,490,594 B1* | 12/2002 | Lomet | 1/1 |
| 6,516,337 B1 | 2/2003 | Tripp et al. | |
| 6,523,027 B1 | 2/2003 | Underwood | |
| 6,564,215 B1* | 5/2003 | Hsiao et al. | 707/8 |
| 6,578,041 B1* | 6/2003 | Lomet | 1/1 |
| 6,587,933 B2* | 7/2003 | Crockett et al. | 711/154 |
| 6,668,253 B1 | 12/2003 | Thompson et al. | |
| 6,675,205 B2 | 1/2004 | Meadway et al. | |
| 6,694,447 B1* | 2/2004 | Leach et al. | 714/6 |
| 6,718,361 B1* | 4/2004 | Basani et al. | 709/201 |
| 6,748,447 B1* | 6/2004 | Basani et al. | 709/244 |
| 6,766,326 B1 | 7/2004 | Cena | |
| 6,920,537 B2* | 7/2005 | Ofek et al. | 711/163 |
| 6,978,279 B1* | 12/2005 | Lomet et al. | 1/1 |
| 6,993,587 B1* | 1/2006 | Basani et al. | 709/229 |
| 7,100,195 B1 | 8/2006 | Underwood | |
| 7,103,740 B1* | 9/2006 | Colgrove et al. | 711/162 |
| 7,107,395 B1* | 9/2006 | Ofek et al. | 711/112 |
| 7,146,476 B2* | 12/2006 | Sandorfi et al. | 711/162 |
| 7,177,886 B2 | 2/2007 | Pruet, III | |
| 7,197,520 B1* | 3/2007 | Matthews et al. | 707/204 |
| 7,212,726 B2 | 5/2007 | Zetts | |
| 7,266,655 B1* | 9/2007 | Escabi et al. | 711/162 |
| 7,277,941 B2* | 10/2007 | Ignatius et al. | 709/225 |
| 7,315,923 B2* | 1/2008 | Retnamma et al. | 711/162 |
| 7,346,682 B2* | 3/2008 | Basani et al. | 709/224 |
| 7,426,652 B2 | 9/2008 | Liccione et al. | |
| 7,430,647 B2* | 9/2008 | Sandorfi et al. | 711/162 |
| 7,451,221 B2* | 11/2008 | Basani et al. | 709/226 |
| 7,461,100 B2* | 12/2008 | Spear et al. | 707/204 |
| 7,512,835 B2 | 3/2009 | Bartfai et al. | |
| 7,523,348 B2 | 4/2009 | Anand et al. | |
| 7,568,124 B2* | 7/2009 | Ali et al. | 714/6 |
| 7,721,117 B2* | 5/2010 | Sherer et al. | 713/193 |
| 7,725,438 B1* | 5/2010 | Shah et al. | 707/646 |
| 7,747,741 B2* | 6/2010 | Basani et al. | 709/224 |
| 7,756,833 B2* | 7/2010 | Van Ingen et al. | 707/640 |
| 2002/0029207 A1 | 3/2002 | Bakalash et al. | |
| 2002/0129096 A1 | 9/2002 | Mansour et al. | |
| 2002/0163910 A1 | 11/2002 | Wisner et al. | |
| 2003/0005350 A1 | 1/2003 | Koning et al. | |
| 2003/0009295 A1 | 1/2003 | Markowitz et al. | |
| 2003/0058277 A1 | 3/2003 | Bowman-Amuah | |
| 2003/0061456 A1* | 3/2003 | Ofek et al. | 711/162 |
| 2003/0120458 A1 | 6/2003 | Rao | |
| 2003/0135499 A1 | 7/2003 | Schirmer et al. | |
| 2003/0159083 A1 | 8/2003 | Fukuhara et al. | |
| 2003/0200272 A1 | 10/2003 | Campise et al. | |
| 2003/0229900 A1 | 12/2003 | Reisman | |
| 2003/0233518 A1 | 12/2003 | Yamagami et al. | |
| 2004/0031058 A1 | 2/2004 | Reisman | |
| 2004/0034808 A1 | 2/2004 | Day et al. | |
| 2004/0098547 A1* | 5/2004 | Ofek et al. | 711/162 |
| 2004/0158766 A1 | 8/2004 | Liccione et al. | |
| 2004/0215656 A1 | 10/2004 | Dill et al. | |
| 2004/0215709 A1* | 10/2004 | Basani et al. | 709/201 |
| 2004/0225834 A1* | 11/2004 | Lu et al. | 711/114 |
| 2004/0268175 A1 | 12/2004 | Koch et al. | |
| 2005/0010550 A1 | 1/2005 | Potter et al. | |
| 2005/0015466 A1 | 1/2005 | Tripp | |
| 2005/0044197 A1 | 2/2005 | Lai | |
| 2005/0071392 A1* | 3/2005 | Sandorfi et al. | 707/204 |
| 2005/0108486 A1* | 5/2005 | Sandorfi | 711/162 |
| 2005/0193235 A1* | 9/2005 | Sandorfi et al. | 714/6 |
| 2005/0198359 A1* | 9/2005 | Basani et al. | 709/232 |
| 2005/0228937 A1 | 10/2005 | Karr et al. | |
| 2005/0246345 A1 | 11/2005 | Lent et al. | |
| 2005/0246510 A1* | 11/2005 | Retnamma et al. | 711/162 |
| 2005/0257062 A1* | 11/2005 | Ignatius et al. | 713/176 |
| 2005/0268145 A1 | 12/2005 | Hufferd et al. | |
| 2005/0278391 A1* | 12/2005 | Spear et al. | 707/201 |
| 2006/0064444 A1* | 3/2006 | van Ingen et al. | 707/204 |
| 2006/0218210 A1 | 9/2006 | Sarna et al. | |
| 2006/0248212 A1* | 11/2006 | Sherer et al. | 709/231 |
| 2006/0248213 A1* | 11/2006 | Sherer et al. | 709/231 |
| 2007/0124341 A1 | 5/2007 | Lango et al. | |
| 2008/0091894 A1* | 4/2008 | Retnamma et al. | 711/161 |

OTHER PUBLICATIONS

Adams, K. 2002. Geographically Distributed System for Catastrophic Recovery. Proceedings of LISA '02: Sixteenth Systems Administration Conference (Nov. 2002), 47-64.*

Gait, J. 1991. Stability, Availability, and Response in Network File Service. IEEE Trans. Softw. Eng. 17, 2 (Feb. 1991), 133-140. DOI= http://dx.doi.org/10.1109/32.67594.*

Form PCT/ISA/220, PCT/US06/02405, "PCT Notification of Transmittal of the International Search Report and the Written Opinion of the International Searching Authority, or the Declaration," 1 pg.

Form PCT/ISA/210, PCT/US06/02405, "PCT International Search Report," 2 pgs.

Form PCT/ISA/237, PCT/US06/02405, "PCT Written Opinion of the International Searching Authority," 4 pgs.

Form PCT/ISA/220, PCT/US06/30928, "PCT Notification of Transmittal of the International Search Report and the Written Opinion of the International Searching Authority, or the Declaration," 1 pg.

Form PCT/ISA/210, PCT/US06/30928, "PCT International Search Report," 3 pgs.

Form PCT/ISA/237, PCT/US06/30928, "PCT Written Opinion of the International Searching Authority," 6 pgs.

Form PCT/ISA/220, PCT/US06/30927, "PCT Notification of Transmittal of the International Search Report and the Written Opinion of the International Searching Authority, or the Declaration," 1 pg.

Form PCT/ISA/210, PCT/US06/30927, "PCT International Search Report," 2 pgs.

Form PCT/ISA/237, PCT/US06/30927, "PCT Written Opinion of the International Searching Authority," 7 pgs.

Form PCT/ISA/220, PCT/US06/38260, "PCT Notification of Transmittal of the International Search Report and the Written Opinion of the International Searching Authority, or the Declaration," 1 pg.

Form PCT/ISA/210, PCT/US06/38260, "PCT International Search Report," 2 pgs.

Form PCT/ISA/237, PCT/US06/38260, "PCT Written Opinion of the International Searching Authority," 3 pgs.

Form PCT/ISA/220, PCT/US06/38291, "PCT Notification of Transmittal of the international Search Report and the Written Opinion of the International Searching Authority, or the Declaration," 1 pg.

Form PCT/ISA/210, PCT/US06/38291, "PCT International Search Report," 2 pgs.

Form PCT/ISA/237, PCT/US06/38291, "PCT Written Opinion of the International Searching Authority," 3 pgs.

Form/IB/373, PCT/US06/038260, "International Report on Patentability," 1 pg.

Form/IB/373, PCT/US06/038291, "International Report on Patentability," 1 pg.

Form EPO/1507S, PCT/US06/002405, "EPO Communication" 1 pg.

Form EPO/1503, PCT/US06/002405, "Supplementary European Search Report", 3 pgs.

Form EPO/P0459, PCT/US06/002405, "Annex to the European Search Report", 1 pg.

Form EPA/2906, PCT/US06/002405, "Examination", 5 pgs.

Adams K. Geographically Distributed System for Catastrophic Recovery. LISA 2002. Nov. 3-8, 2002, pp. 47-64.

Rosenblum, M and Ousterhout, J.K, 1992. The design and implementation of a log-structured file system. ACM Trans. Comput. Syst. 10,1 (Feb. 1992), 26-52 DOI= http://doi.acm.org/10.1145/146941.146943.

Gait, J,1991. Stability, Availability, and Response in Network File Service. IEEE Trans. Softw. Eng. 17, 2(Feb. 1991),133-140 DOI=http://dx.doi.org/10.1109/32.67594.

Spurzem B: "Mimosa NearPoint for Microsoft Exchange Server" Internet [Online] Jan. 2005, pp. 1-18, XP002519249 Retrieved from the Internet: URL:http://www.Flexnet.com/Exhange_Email_Archiving_and_Compliance/NearPoint%20Architecture%20for%20Exchange.pdf> [retrieved on Mar. 11, 2009] * p. 5, line 18—line 20 * * p. 6, line 2—line 5 * * p. 6, line 16—line 26 * * p. 7, line 22—line 33 * * p. 8, line 4—line 15 * * p. 8, line 25—line 28 * * figure 2 *.

Spurzem B: "Advantages of Mimosa NearPoint for Email Archival" Internet, [Online] Jan. 2005, pp. 1-14, XP002519383 Retrieved from the Internet: URL:http://www.Flexnet.com/Exchange_Email_Archiving_and_Compliance/NearPoint%20E-mail%20Archive%20for%20Exchange.pdf> [retrieved on Mar. 11, 2009] * p. 3, line 1-17 * * p. 9, line 1—p. 11, line 8 * * figure 1 *.

Mimosa Systems: Mimosa Architecture Internet, [Online] Oct. 29, 2004, pp. 1-5, XP002519438 Retrieved from the Internet: URL:http://web.archive.org/web/20041029172122/www.mimosasystems.com/arch.htm> [retrieved on Mar. 11, 2009] * p. 4, line 5- line 24 *.

Kupsys, A.; Ekwall R., "Architectural Issues of JMS Compliant Group Communication," Network Computing and Applications, Fourth IEEE International Symposium on Volume, Issue, Jul. 27-29, 2005 pp. 139-148.

Narasimhan P. et al. "Eternal- A component-based framework for transparent fault-tolerant CORBA". In Software—Practice and Experience. vol. 32, No. 8, pp. 771-788. Jul. 10, 2002.

* cited by examiner

RETRO-FITTING SYNTHETIC FULL COPIES OF DATA

RELATED APPLICATION

This application is continuation-in-part of the U.S. patent applcation Ser. No. 11/500,809 filed Aug. 7, 2006, which is a continuation-in-part of U.S. patent applcation Ser. No. 11/211,056, filed Aug. 23, 2005, now U.S. Pat. No. 7,778,976 which claims the benefit of U.S. Patent Application Number 60/650,556, filed Feb. 7, 2005.

This application is related to the following U.S. patent applications, each of which was filed Aug. 7, 2006: Ser. No. 11/500,864; Ser. No. 11/500,805; Ser. No. 11/500,806; and Ser. No. 11/500,821.

TECHNICAL FIELD

The disclosure herein relates generally to data protection, archival, data management, and information management.

BACKGROUND

Data servers host critical production data in their storage systems. The storage systems are usually required to provide a level of data availability and service availability. Data and service are usually required to be resilient to a variety of failures, which could range from media failures to data center failures. Typically this requirement is addressed in part by a range of data protection schemes that may include tape-based backup of all or some of the production data.

In addition there is typically a need for other servers to concurrently access this same critical production data. These applications include data protection applications, site replication applications, search applications, discovery applications, analysis applications, and monitoring and supervision applications. This need has been addressed by a range of data management schemes, including setting up a specialized analysis server with a replica of the critical production data. Typical data protection and management schemes have some well known limitations. For example, in some cases, direct access to the enterprise server could result in instability and performance load on the enterprise servers. Other limitations are related to the serial and offline nature of traditional tape storage, which makes access to backed-up data time-consuming and inefficient.

While it is theoretically possible to transfer the entire source data on the Production System to the Management System, this is not efficient in practice. Instead, conventional systems and methods create an entire baseline copy of the source data on the Management System, followed by the periodic, or continuous, changes to the data that are occurring on the Production System, and transfer the baseline copy and the changes to the Management System. These changes are then applied to the copy of the data on the Management System, thereby bringing it up-to-date. While some database management systems provide these intrinsic capabilities that are known as "Log Shipping", log shipping is not available in other databases like non-relational databases or databases of file system data.

INCORPORATION BY REFERENCE

Each publication and patent application mentioned in this specification is herein incorporated by reference in its entirety to the same extent as if each individual publication or patent application was specifically and individually indicated to be incorporated by reference.

DETAILED DESCRIPTION

Figure 1:
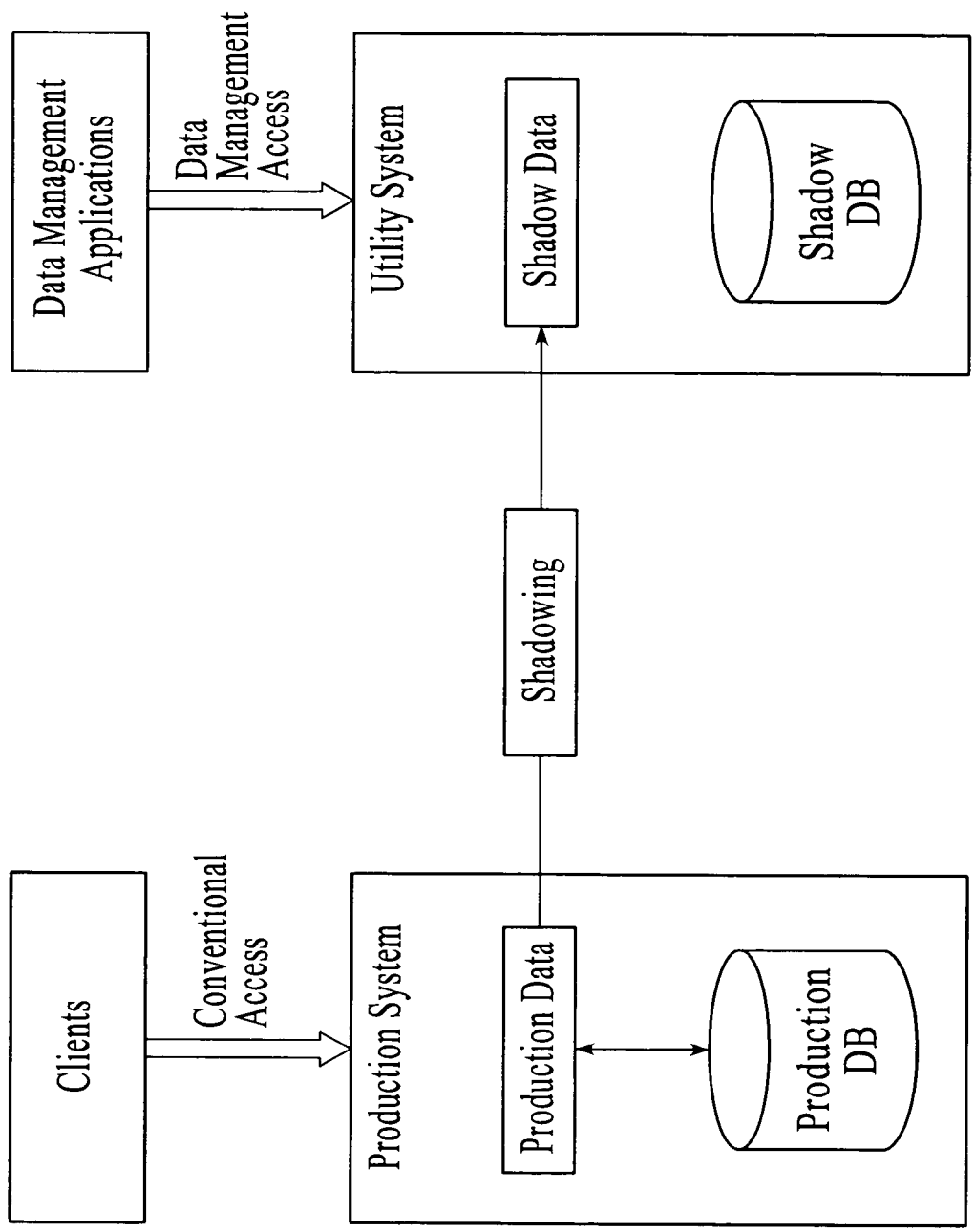
FIG. 1 is a block diagram of a data surrogation system, according to an embodiment.

Multi-dimensional data surrogation and corresponding systems and methods are described herein. Embodiments of data surrogation enable a host of open-ended data management applications while minimizing data movement, latencies and post-processing. Embodiments provide protection of data, while storing the data in such a way as to be easily located and accessed. Application-aware one-pass protection is described, including production server database shadowing using log shipping for creation of synthetic full copies (also referred to herein as "synthetic fulls") of the database, transformation of the copied data from "bulk" form to "brick" form, classification of the data, tiered storage of the data according to the classification, and life-cycle management of the stored data.

There are many advantages provided by the embodiments described herein as compared to prior systems that do not inherently include log shipping. For example, when performing synthetic fulls, any corruption is catalyzed right away. This is in contrast to typical systems with disc-based or tape-based backup. In typical system, full copies of the database and incremental updates to the database (in the form of log files) are saved. In the case of a production server failure, the log files must typically all be applied at once. If a corrupted file is encountered, or anything causes the process to fail, it is not possible to access either the "primary" production server or the back-up data.

Another advantage provided by embodiments described herein is the use of less storage space. Significantly less storage space is used to store log files because, in contrast to prior systems that merely store log files, the log files are consumed as they are generated according to various intervals, schedules, events, etc.

Embodiments described herein perform shadowing of production server databases, including creation of synthetic fulls by retrofitting log shipping to database systems, including enterprise database systems, or other systems, that do not have log shipping capabilities. For example, the shadowing described herein can be used to integrate log shipping capability with non-relational databases or databases of file system data.

Shadowing maintains an off-host copy of up-to-date enterprise production data for purposes that include one or more of protection, archival and analysis. Shadowing optionally leverages lower-level mechanisms such as backup, replication, snapshots, or continuous data protection (CDP) to construct an aggregate system and method for making near real-time production data available to applications in a manner that is non-disruptive to the production host, while at the same time being trusted, scalable and extensible.

In an embodiment, shadowing includes receiving a copy of original data from the production system, including an initial copy of a production database. Delta data is received from the production system in multiple instances. The delta data includes information of changes to the original data. An updated version of the copy is generated and maintained by applying the delta data as the delta data is received. In an embodiment, the delta data includes log files, but embodiments are not so limited. The delta data includes data of an incremental difference, or alternatively, of a differential difference between the original data at different instances.

FIG. 1 is a block diagram of a data surrogation system 100, according to an embodiment. Data surrogation as described with reference to different embodiments herein includes systems and methods that enable a range of data management solutions for production servers and enhanced capabilities for production server clients. An example of a production server is any server usually referred to as an enterprise server, but embodiments are not so limited. For example, a Microsoft Exchange™ server is used as one example of a production server.

Clients include any client device or application that provides end-user access to production or enterprise servers. An example of a client is Microsoft Outlook™ but the embodiments described herein are not so limited.

The system 100 includes a production system and utility system. The production system, in an embodiment, includes production data and a production database. An embodiment of a production system includes one or more messaging and collaboration servers (e.g. electronic mail (email) servers) that can be local or distributed through the enterprise and either single-computer or clustered and replicated. An example of an email server is Microsoft Exchange™ Server but the embodiment is not so limited. Conventional access describes normal interaction between the production clients and production servers. In the case of Microsoft Exchange™ and Outlook™, for example, conventional access may include the MAPI protocol, but other protocols, such as IMAP4 and POP3, are also applicable.

The system 100 also includes a utility system. The utility system handles production data after it is produced. The utility system of an embodiment includes one or more data management functions accessible to various data management applications that benefit from access to data shadowed and further processed by the utility system. Data management applications include backup applications, monitoring applications, compliance applications, audit applications, etc. The utility system referred to is intended to encompass the embodiments of data surrogation, including or shadowing methods and apparatus as disclosed.

Throughout the disclosure, where a database is shown or described, one or more corresponding servers are implied, even if not shown or described. For example, a production database implies a production server, and a utility database implies a utility server. In various embodiments described herein, the utility server is a near-line server including the data surrogation or shadowing methods and apparatus described and claimed herein. Embodiments of the data surrogation or shadowing methods and apparatus described products available from Mimosa Systems, Inc., of Santa Clara, Calif., including the NearPoint™ for Microsoft® Exchange Server Disaster Recovery Option. Embodiments of the data surrogation or shadowing methods and apparatus include an add-on module that integrates with a near-line server. In an embodiment, the near-line server is a Near-Point™ server, available from Mimosa Systems.

Shadowing generates shadow data that provides a relationship between the production data on the enterprise production system and the data on the utility system. The utility system stores the shadow data in a shadow database, also referred to as a shadow repository. The utility system can optionally leverage near-line storage to reduce costs.

In an embodiment, shadowing is a method that maintains a relatively up-to-date copy of production enterprise data in a data surrogate, which in this case includes the shadow database. This data may be optionally translated into multiple alternate formats and augmented with metadata.

The production and/or utility systems can be single computers or they may be clustered, replicated and/or distributed systems. The production and/or utility systems can be in the same data center or they can be remote. In an embodiment, the primary connectivity between the production system and the utility system is through a local area network (LAN), a metropolitan area network (MAN) or a wide area network (WAN). An optional storage area network (SAN) can be used for the data access and data movement.

As referred to herein, clients and servers can be any type and/or combination of processor-based devices. Reference to a system and/or a server in the singular tense may include multiple instances of that system or server. Couplings between various components of the system embodiments described herein can include wireless couplings, wired couplings, hybrid wired/wireless couplings, and other network coupling types, as appropriate to the host system configuration. The network components and/or couplings between system components can include any of a type, number, and/or combination of networks and the corresponding network components including, but not limited to, a wide area network (WAN), local area networks (LAN), metropolitan area network (MANs), proprietary network, backend network, and the Internet to name a few. Use herein of terms like transport, interconnect, or network is inclusive of a conventional Ethernet, a Storage Area Network (SAN), and/or other type of network. The protocols may be inclusive of Transmission Control Protocol (TCP)/Internet Protocol (IP) (TCP/IP) and layered protocols, Internet Small Computer System Interface (SCSI) (iSCSI), Fibre Channel, InfiniBand, HyperTransport (HT), Virtual Interface (VI), Remote Direct Memory Access (RDMA), and a range of other protocols.

Figure 2:
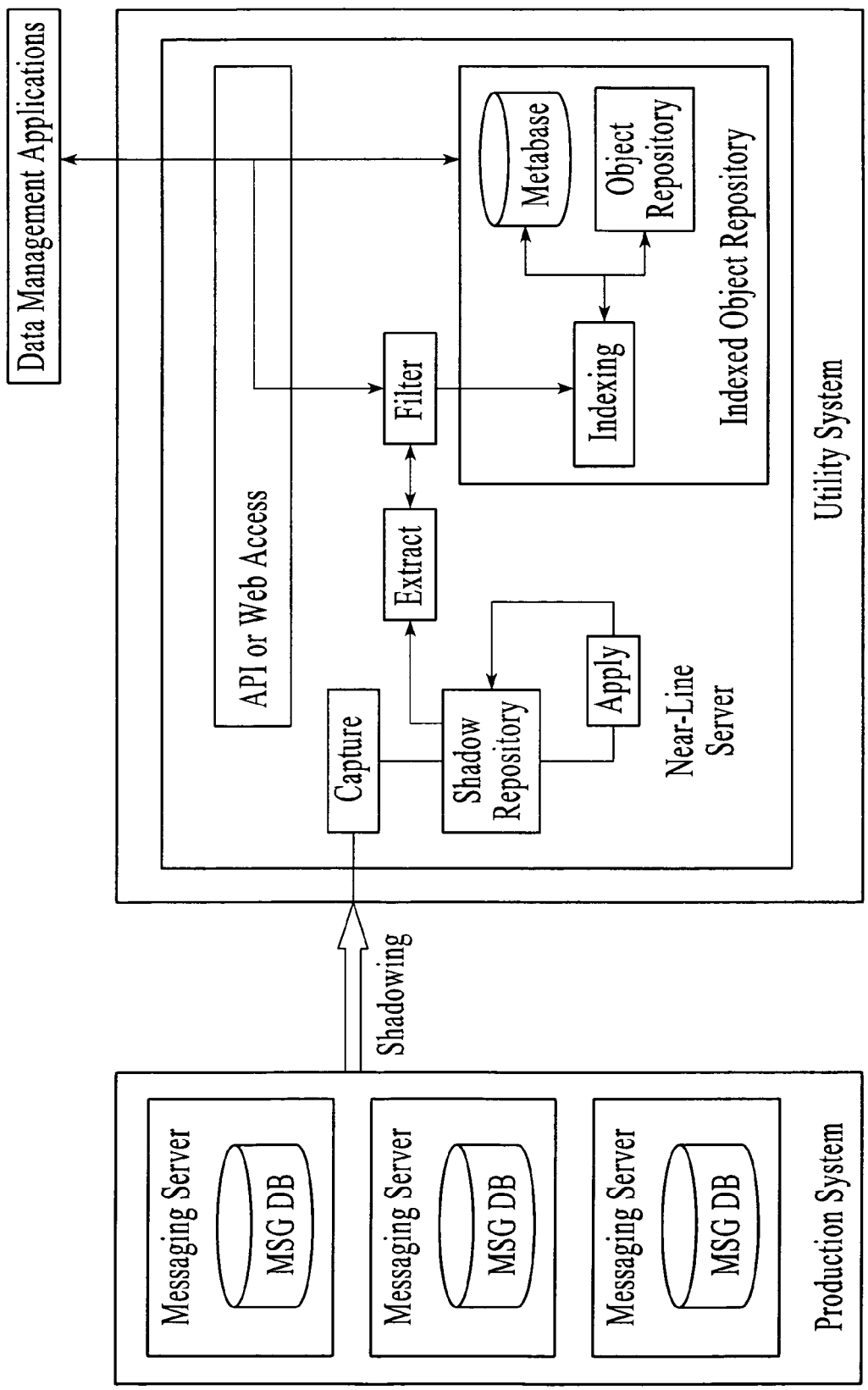
FIG. 2 is a block diagram of a data surrogation system that includes a production system with multiple production servers and corresponding databases according to an embodiment.

FIG. 2 is a block diagram of a system 200 that includes a production system with multiple production servers and corresponding databases. In an embodiment, the production servers are messaging servers, and the databases are messaging databases, but embodiments are not so limited. Production servers can include messaging servers, collaboration servers, portals, or database servers. Production servers host a variety of structured, semi-structured, and unstructured data. These servers may be individual, clustered, replicated, constituents of a grid, virtualized, or any combination or variation. An example that is used for illustration purposes is a Microsoft Exchange™ Server but the embodiments described herein are not so limited.

A utility system includes a shadow repository, as previously described. The shadow repository includes shadow data that is received from one or more of the messaging databases. A capture component obtains a copy of production data, and an application (or "apply") component keeps the shadow data up-to-date, as further described below.

The capture component is configured to reduce disruption of production system operations. The capture component is able to capture the production data in a scalable and high-performance manner, securely and reliably. The data captured may be referred to variously herein as data, production data, the production database, etc. In general, the data captured is a production database file that includes one or more of application data, databases, storage groups, mailbox data, and server data.

The capture component supplies data to the shadow repository to keep the shadow copy as up-to-date as possible with high efficiency and low cost. The capture component can include backup, snapshots, replication, and continuous data protection (CDP) methods but is not so limited. Various capture components configured for use in an embodiment are described in detail below.

The apply component is intrinsic to a data type in an embodiment. In an alternative embodiment, the apply component is retro-fitted to work with the particular data type. Typically enterprise applications reside on relational databases. Relatively more capable databases such as Oracle™, DB2™ and Microsoft SQL™ Server offer log shipping mechanisms that facilitate direct re-use for application. However relatively less-capable databases and/or other semi-structured or unstructured data do not include log shipping capabilities. Microsoft Exchange™ Server is an example of an enterprise server that resides on a database that does not support log shipping. The shadowing described herein provides log-shipping capability in support of the shadowing of databases and/or other semi-structured or unstructured data.

An extraction (or "extract") component of an embodiment optionally transforms data formats from a relatively dense application format to a format that is directly usable by data management applications. The extract component provides high-performance, scalable, lossless, flexible and extensible data transformational capabilities. The extraction capabilities described herein are not present in systems such as the Microsoft Exchange™ Server. For example, the Microsoft Exchange™ Server provides a messaging application programming interface (MAPI) and protocol that is relatively difficult to deploy on a remote utility or management server, and generally does not meet the performance and scalability requirements of management applications.

An indexed object repository (IOR) includes extracted (or transformed) data objects in an object database, and metadata related to the objects in a metadata database, or "metabase".

As used herein, object denotes a data item in an application-aware format. An example of an object stored in the object database is an email message body, but there are many other examples.

An optional filter provides the data management applications with an API or Web Service capability for tuning or parameterizing the extract process.

An optional indexing mechanism operates on the data and metadata in the indexed object repository looking for patterns and relationships. When the indexing mechanism finds relevant information, it enhances the metadata with this new information. Optionally the indexing mechanism may be guided by a data management application through the filter.

In an embodiment, data management applications have API or Web Service access to the aggregate data as it is being semantically indexed. For examples, the data management applications can get proactive notifications and callbacks when relevant additional data or metadata has been added to the indexed object repository. In an embodiment, the utility system is actively involved in influencing, guiding, participating in, or extending the function of the production servers. Applications that are part of the utility system can become active or passive participants in the production server workflow through positive or negative feedback loops and augmentation of the production server function to solve existing pain points or improve productivity through value additions.

The embodiment of FIG. 2 includes a configuration with three messaging servers and one near line server. Other deployment variations are possible, including a variable number of homogeneous or heterogeneous production servers, and a complex near line server that may be clustered, distributed, part of a grid, or virtualized. Although FIG. 2 shows three messaging servers, it is possible to provide equivalent services to multiple, arbitrary homogeneous heterogeneous servers. Although FIG. 2 shows a single near line server, it may in actuality be clustered, distributed, replicated, virtualized, and may straddle multiple machines or sites.

Embodiments of a shadowing method are described herein with reference to an example host system. The shadowing is described in the context of providing log shipping of the application component for a Microsoft Exchange™ Server as an example, but the shadowing described herein is not limited to the Microsoft Exchange™ Server.

Figure 3:
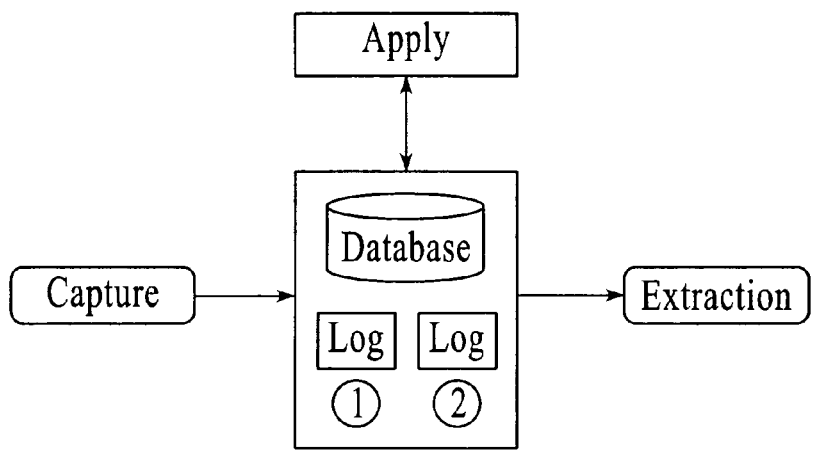
FIG. 3 is a block diagram showing a capture operation, an apply operation, and an extraction operation according to an embodiment.

FIG. 3 is a block diagram showing a capture component, an apply component, and an extract component under an embodiment. The capture generates or provides a baseline full copy of the production data. This full copy data can be directly passed to an extraction component for converting the dense application format into another format desirable to post-processing entities. An embodiment can optionally include cleansing and/or repairing of the full copy data prior to extraction when the capture component does not provide application consistent data. In embodiments to be further described below, log files ("logs" 1 and 2 are shown as an example) are shipped from the production system as they are generated, and are applied to the full copy to keep it up-to-date as a shadow copy of the production database.

Figure 4:
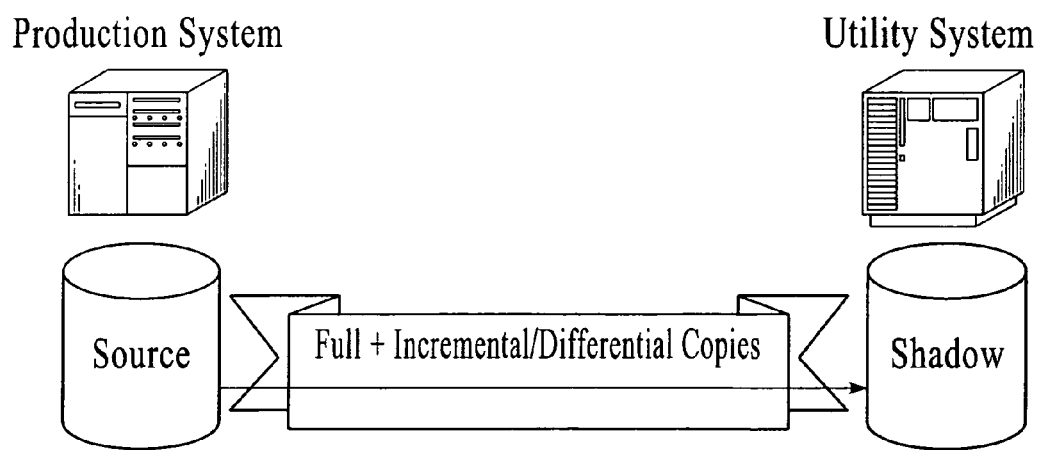
FIG. 4 is a block diagram of backup capture used in shadowing, according to an embodiment.

The capture component of shadowing is configured to use one or more data capture capabilities that can include backup, snapshots, replication, and/or continuous data protection. FIG. 4 is a block-diagram of backup capture used in shadowing, under an embodiment. The backup capture uses the backup APIs provided by the application running on the production system. In this example the production system is Microsoft Exchange™ Server but is not so limited. The utility system is configured to obtain occasional full backups and frequent incremental or differential backups. Both these mechanisms typically run on a default or administrator-configured schedule. There are other enhancements or variations that include the ability to detect that new log files have been generated on the production system and pulling a copy over ("dynamic log shipping") or mechanisms for "tailing" the log files as they are being written on the production system.

Figure 5:
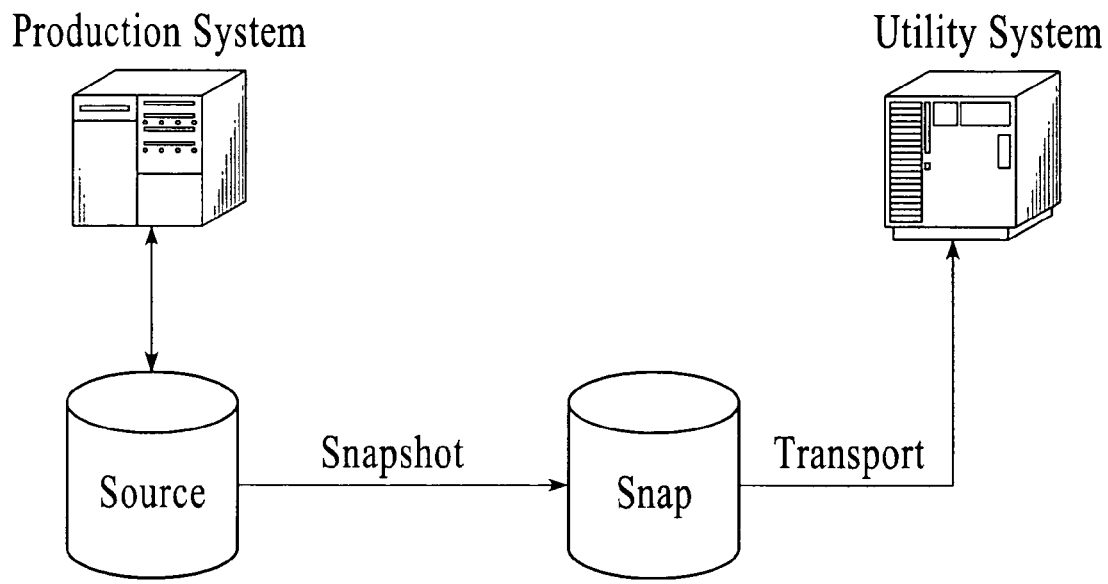
FIG. 5 is a block diagram of snapshot capture used in shadowing, according to an embodiment.

FIG. 5 is a block diagram of snapshot capture used in shadowing, under an embodiment. The snapshots of snapshot capture are either crash consistent or application consistent. Typically "hot split" snapshots that are obtained by breaking mirrors without application involvement tend to be crash consistent. An example of an application consistent snapshot mechanism is Microsoft Data Protection Manager™. The snapshots can either be local, which requires the management server to be co-located in the same data center, or the snapshots can be remote. The production and utility systems can be single computers, or they may be clustered, replicated and/or distributed. The transports for control and communication are typically LAN, MAN or WAN. An optional SAN can facilitate efficient data movement.

For snapshots that are crash consistent, additional mechanisms can be used to validate the snapshots for consistency (and perhaps repeat the process until a reasonably consistent copy is available). The additional mechanisms can cleanse and/or repair the data in order to make it ready for application.

Figure 6:
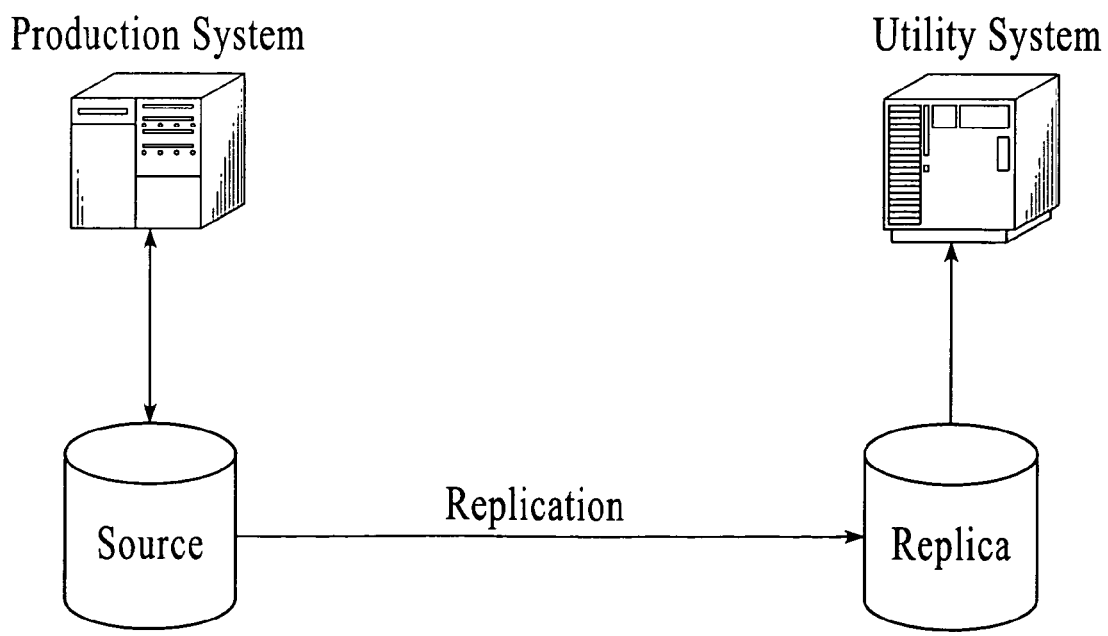
FIG. 6 is a block diagram of replication capture used in shadowing, according to an embodiment.

FIG. 6 is a block diagram of replication capture used in shadowing, under an embodiment. The replication can be local within a data center, or it can be remote over a MAN, WAN or SAN. The replication maintains a replica on the utility system that can be used for capture. Conventional replication shares the characteristics of crash consistent mirrors, and the replication can be annotated by an "event stream" that captures points in time that are likely to be application consistent. The production and utility systems can be single computers, or they can be clustered, replicated and/or distributed. The transports for control and communication include LAN, MAN and/or WAN. An optional SAN can facilitate efficient data movement.

The capture of production data using replication includes use of replication techniques that capture every relevant write at the source (e.g., the production system) and propagate the captured writes to the target (e.g., the utility system) to be applied to the copy of the data to bring it up-to-date. This replication can be synchronous, asynchronous, or a quasi-synchronous hybrid. The production and utility systems may be single computers, or they may be clustered, replicated or distributed. As in the case of snapshot capture, additional mechanisms can be used to validate the snapshots for consistency and cleanse and/or repair the data in order to make it ready for application.

Figure 7:
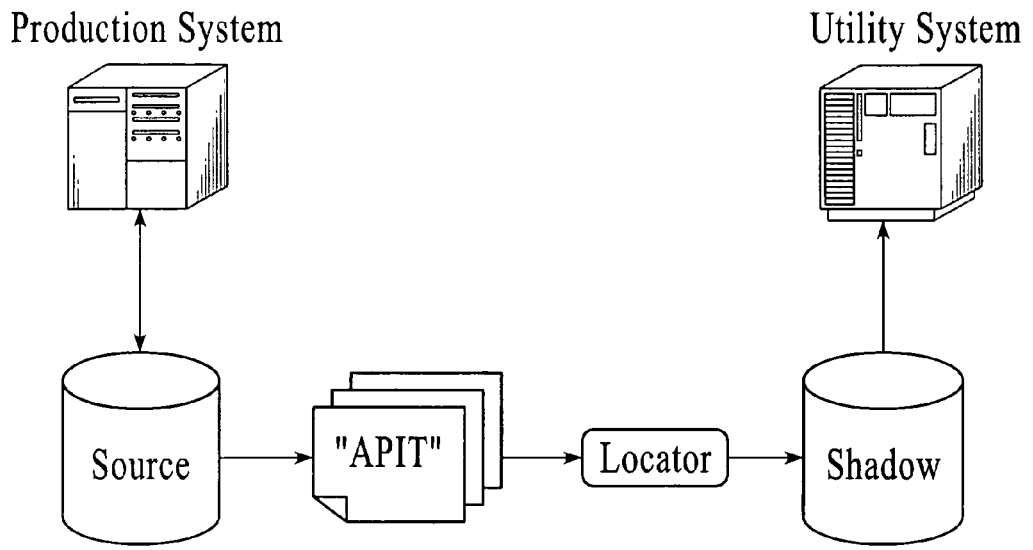
FIG. 7 is a block diagram of continuous data protection (CDP) capture used in shadowing, according to an embodiment.

FIG. 7 is a block diagram of CDP capture used in shadowing, under an embodiment. A capture component provides a stream of changes that have occurred on the production system, and provides the ability to move to "any point in time" (APIT). The stream of changes (APIT) of an embodiment is annotated with an event stream that synchronizes with events on the production system. A locator module can be configured to select the most appropriate points in time for use for application. The production and utility systems can be single computers, or they can be clustered, replicated and/or distributed systems. The transports for control and communication include LAN, MAN or WAN. An optional SAN facilitates efficient data movement.

Figure 8:
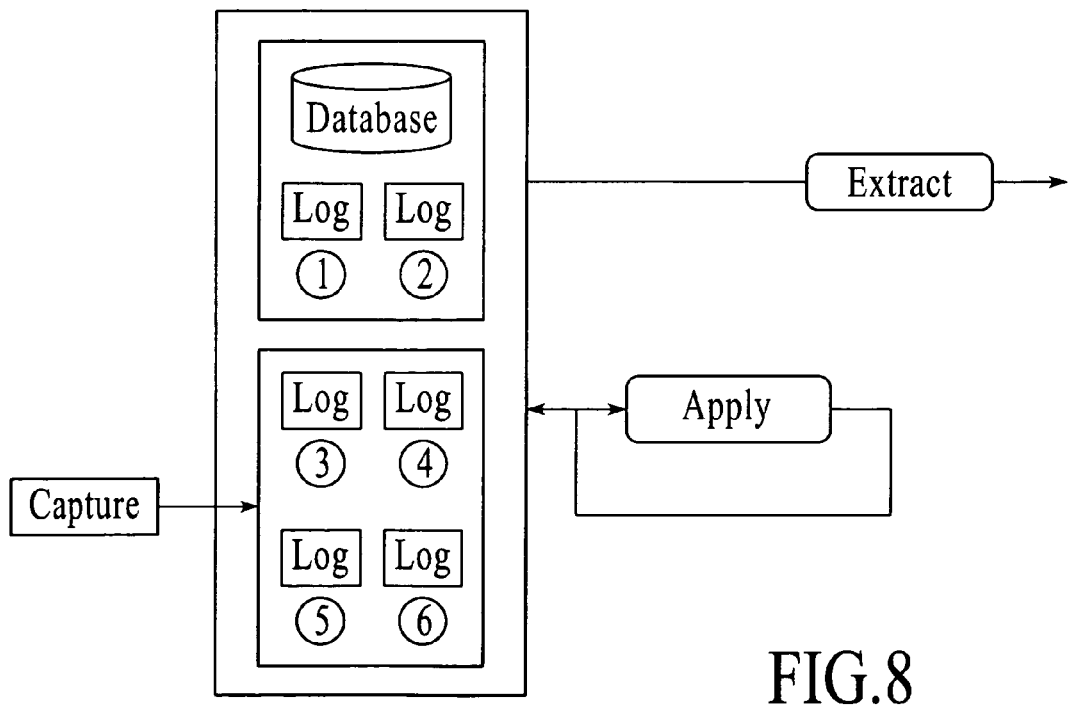
FIG. 8 is a block diagram showing generation of an incremental or differential update of log files from a production system, according to an embodiment.

FIG. 8 is a block diagram showing generation of an incremental or differential update of log files from the production system, under an embodiment. The updating of log files (also referred to herein as logs or transactional logs) includes adding data from the capture operation to the shadow repository with the previous database and logs. The update of logs includes an apply, or log apply operation (also known as log shipping) that applies the logs to the database to bring it up-to-date.

The update of logs can optionally include an extract operation. The extract operation is performed on the data resulting from the log apply operation to transform the resulting data from dense application format to one or more target formats for subsequent consumption by various data management applications.

Figure 9:
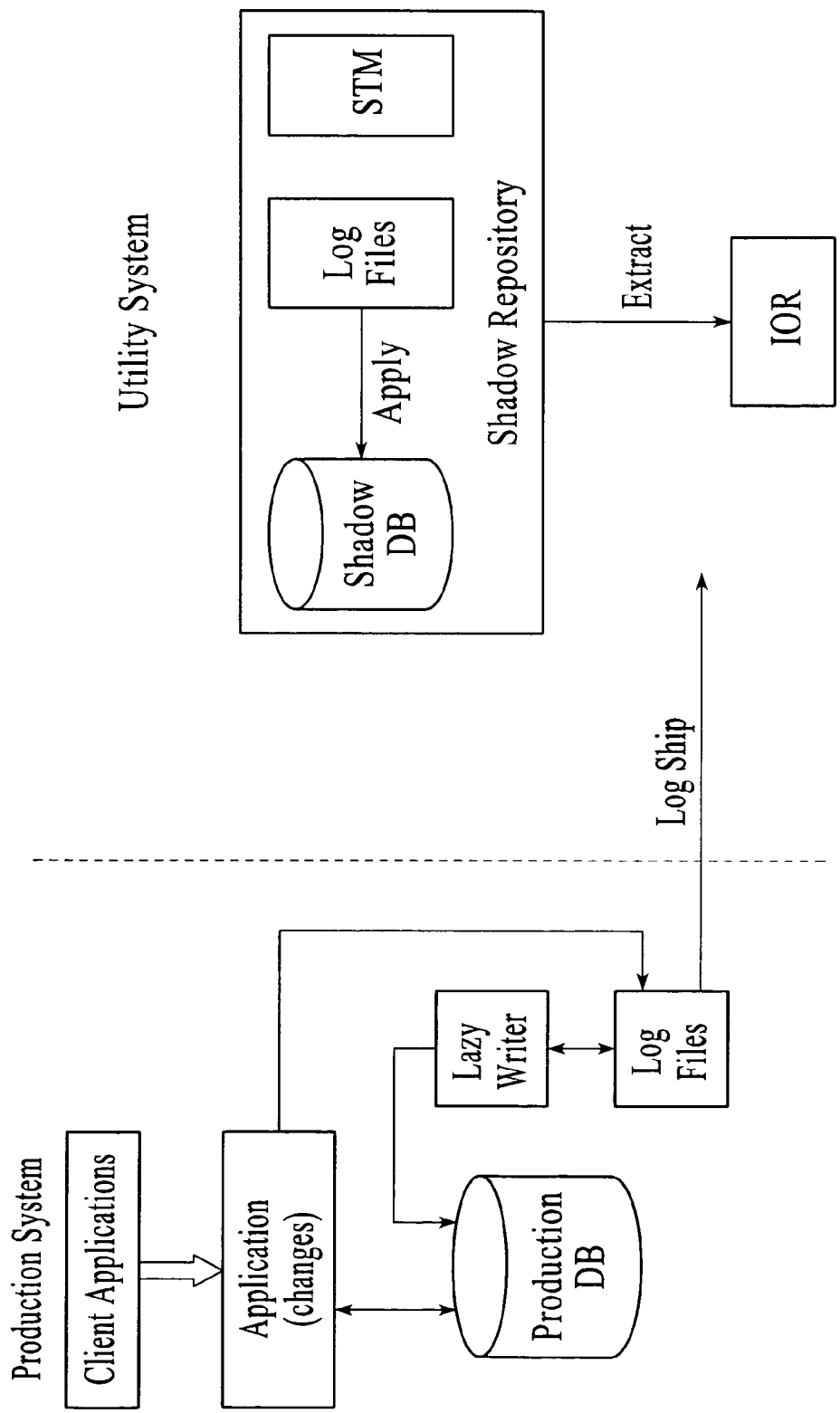
FIG. 9 is a block diagram of a system that includes shadowing using retro-fitted log shipping to create synthetic fulls according to an embodiment.

FIG. 9 is a block diagram of a system 900 that includes shadowing using retrofitted log shipping to create synthetic fulls according to an embodiment. System 900 includes a production system that performs write-ahead logging. For purposes of illustration, FIG. 9 will be described with reference to Microsoft Exchange™ as a component of the production system, but embodiments are not so limited. The production system includes a Microsoft Exchange™ server and a Microsoft Exchange™ database, in an embodiment. The production system includes one or more databases, although only one is shown.

An application communicates with the production database (which, in the case of Microsoft Exchange™ is called an Exchange database or EDB). When the application detects a change to the database, it performs write-ahead logging to a log file. This includes appending information to the log file, which is much faster than traversing the database structure and updating the database each time there is a change. The information appended to the log file reflects the particular change made to data in the database.

A lazy writer takes all of the logged, but not committed, changes to the database and writes them to disc. One reason to use these log files is if the system suddenly crashes, the system can replay the log files when it comes back up, thus recovering all the lost data. Write-ahead logging is usually used for database systems, but other systems may have different ways of handling changes to data.

Another way of using log files in database systems is for creating a mirror database to provide a backup in the event of server loss or site loss. This is referred to variously as log shipping, log-apply, or synthetic fulls. Any of these terms imply various methods that take incremental changes to a production server and apply them to a database copy on a utility server to bring the copy up-to-date. Log shipping is not supported by some systems, including Microsoft Exchange™. The inability to support log shipping introduces significant limitations on data backup operations, data archiving operations, and data discovery operations. For example, conventionally, third-party applications designed to provide data backup, data archiving and data discovery operations to Microsoft Exchange™ (or other systems without log shipping capabilities) go into the EDB and obtain the bulk version of the database. If such an application repeatedly obtains the bulk database without applying the log files, many databases and many log files are accumulated, which becomes very cumbersome. Then, in order to restore data back to Exchange™, all of the accumulated log files must be applied to the EDB at the time of restoration. This makes the recovery time objective (RTO) of such conventional third-party applications very long.

Performing shadowing with synthetic fulls as described herein allows the log files to be consumed as they are generated, resulting in an improved RTO. In addition, because a copy of the current EDB (including applied log files) is available, extraction and transformation to brick form, according to embodiments to be described, becomes possible.

System 900 further includes a utility system with a shadow repository and an IOR according to an embodiment. Initially, the production database is copied from the production system to the shadow database on the utility system. In addition, log files are shipped from the production system to the shadow repository as they are generated. The shadow repository in an embodiment also store STM files. STM files are files in a well-known format for multi-media, typically emails.

In an embodiment, each time a log file is generated it is received by the utility system and applied to the shadow database according to a retro-fitted log shipping operation. Alternatively, the log files can be batched before applying. Data in the shadow database is extracted to the indexed object repository in an application-aware manner and stored in such a way as to be easily located and accessed, even by data management applications external to the utility system.

Figure 10:
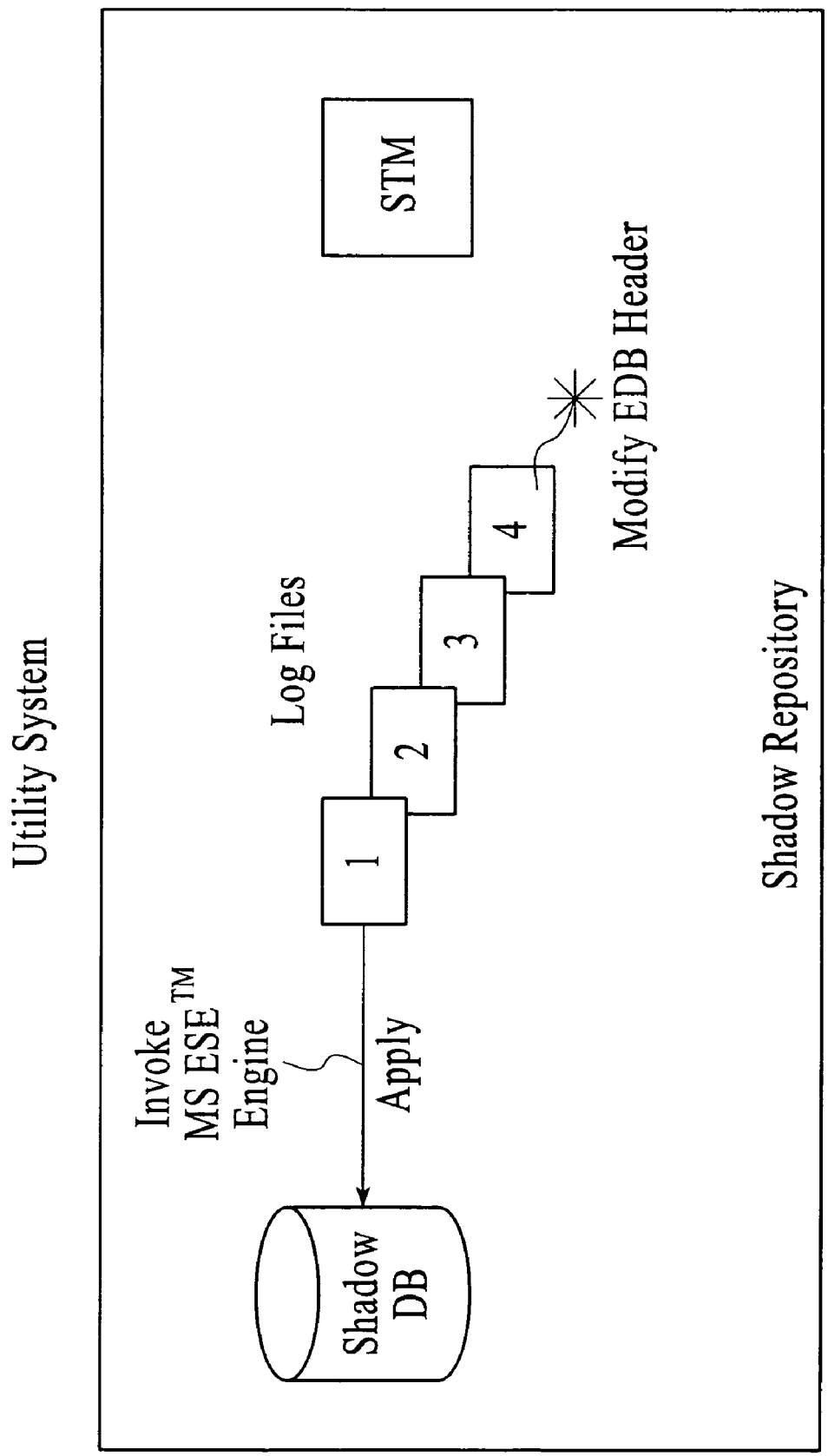
FIG. 10 is a block diagram of a process of obtaining and applying log files, according to an embodiment.

FIG. 10 is a block diagram of a process of obtaining and applying log files, according to an embodiment. The extensible storage engine (ESE) or "engine" (also referred to as a recovery engine herein), used by Microsoft Exchange™, also known as JET Blue, is an indexed sequential access method (ISAM) data storage technology from Microsoft. The engine allows client applications to store and retrieve data via indexed and sequential access. In an embodiment for shadowing a production database, the engine is invoked by the utility system, directed to the database (EDB in this case) and used to facilitate shadowing, including log shipping, and log application.

In an embodiment, an EDB header is made to point to a particular log file number as a starting log file number, and the engine is run. The engine goes through each log file and checks for integrity, for example by checking the checksums. The engine begins applying transactions from the log files into the shadow database. The engine moves through the log files in sequence, applying each log file. For example, log files 1-4 are shown in FIG. 10. When the engine finishes applying the last log file (log file 4), the database enters a "recovered" state which indicates that the data is ready to be restored to the production database. In the recovered state, no more log files can be applied to the database. This state is referred to as "clean shutdown" state in Microsoft Exchange™. This behavior is an artifact from when tape was the dominant backup storage medium. For example, if backups are stored to tape and retrieved from tape, there should never be a need to apply log files more than once. Thus, after a one-time application of log files, the EDB automatically enters a state in which no more logs can be applied. Conventionally, when the production database is backed up, it is transferred in "backed-up" state, which is the state in which log files can be applied. This state is referred to as "dirty shutdown" state in Microsoft Exchange™.

According to an embodiment, in order to apply log files at any time, the EDB is allowed to go into clean shutdown state after the last log file (for example, log file 4). Then the EDB header is modified to indicate that it is in dirty shutdown state. When the utility system is ready to apply a new set of log files, the EDB will be in dirty shutdown state and the engine will be able to apply the log files. This is referred to as toggling the dirty bit(s) in the appropriate header field of the EDB. The EDB and EDB header are specific to certain embodiments, and are not meant to be limiting. In various embodiments, other systems may use different databases in which there are headers or other structural metadata that can be manipulated to achieve the result of allowing application of log files using the database engine as described. The engine may be any recovery engine employed to recover a database including application of changes made to the database, but not yet applied to the database.

Figure 11:
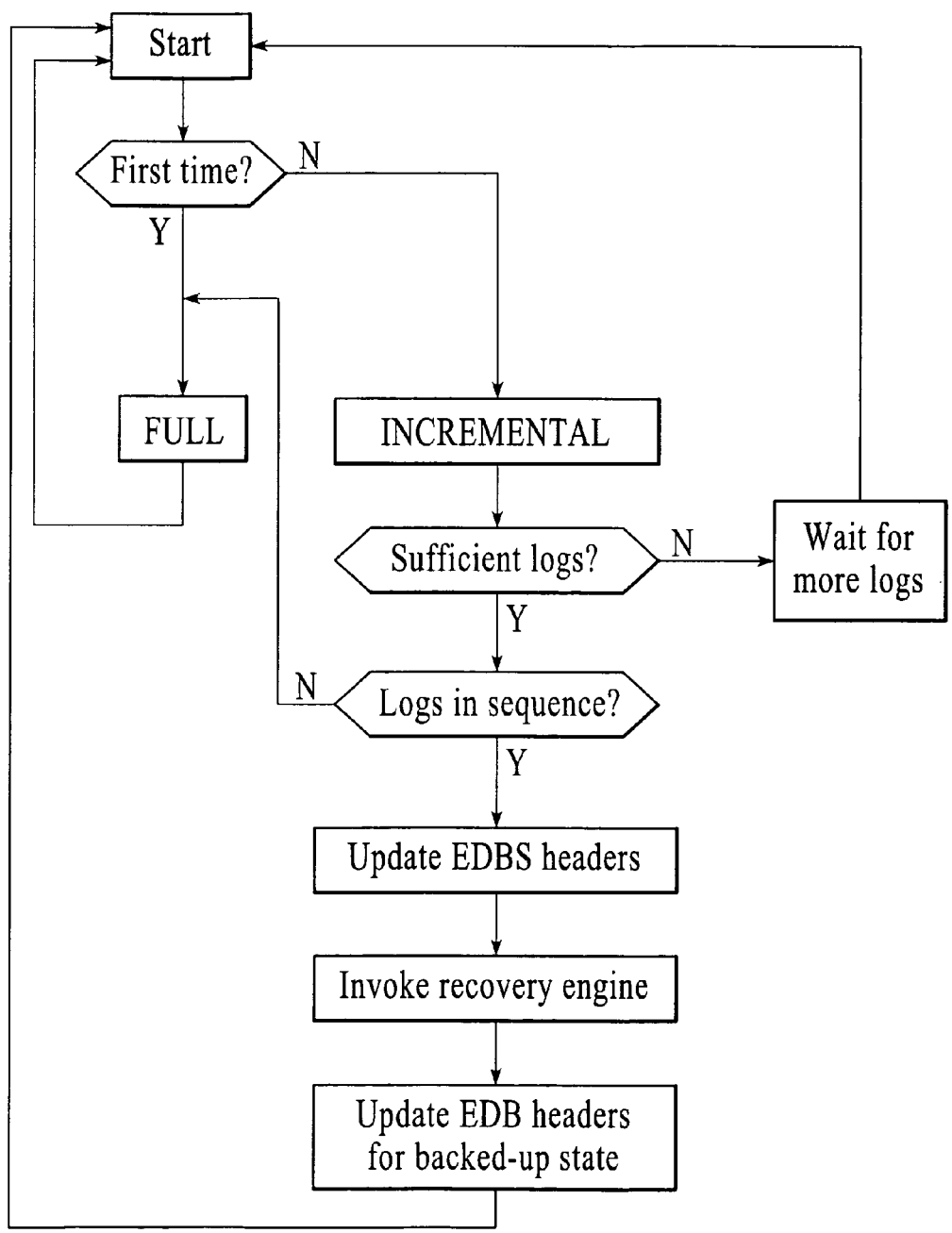
FIG. 11 is a flow diagram illustrating an embodiment of a shadowing process including applying log files according to an embodiment.

FIG. 11 is a flow diagram illustrating an embodiment of a shadowing process including applying log files according to an embodiment. The process starts, and it is determined whether it is the first time the shadowing process has been run. The first time the process has been run may occur when the shadow repository is empty, or when the utility system and/or the shadowing components have just been installed, or when a new repository has been created. If it is the first time the process has been run, a full copy of the production database is acquired. This involves completely copying the production database into the shadow database.

If it is not the first time the process has been run, an incremental copy is acquired. In order to obtain the incremental copy, it is determined whether there are sufficient un-applied logs present. If sufficient un-applied logs are not present, the process waits for sufficient logs. In one embodiment, this includes going back to the initial starting point. If there are sufficient un-applied logs, it is determined whether the logs are in sequence. If the logs are not in sequence, they cannot be applied, and a full copy of the database is obtained. Alternatively, the production system is accessed specifically to acquire the "missing" log files. Logs must be in sequence because of their nature as multiple transactions that may have interdependencies. In a manner that is analogous to the area of microprocessor instructions, for example, database transactions can be committed or uncommitted.

If there are sufficient log files, the appropriate EDB headers are updated. In practice, there are multiple EDBs, so there are multiple EDB headers. The headers are updated to reference the first log file that has not been applied. The database recovery engine, in this case the ESE, is invoked. The engine is used to replicate the EDB by applying the log files. The replicated EDB is used for later transformation from bulk-to-brick according to an embodiment to be later described.

The EDB headers are updated to indicate dirty shutdown state, and the process returns to the starting point.

FIG. 11 illustrates an embodiment for a production database system that does not support log shipping. Embodiments are also applicable to other systems, for example file systems. To keep an updated copy of a set of files, the process starts by acquiring a set of all the files. Later, all the files in the file system that have changed are obtained, and the previous copy is overwritten. Alternatively, just the differences can be obtained and applied to the previous copy. That is another example of a synthetic full. Embodiments of retrofitted log shipping apply to any application data, or unstructured data.

Whether or not log files are retained by the shadowing process, and how long log files are retained depends on whether the log files include any uncommitted transactions. As previously mentioned, each log file could include several transactions and several of the transaction could be outstanding. At some point there is a "begin" transaction, and at another point there is a corresponding "end" transaction. When a "begin" transaction is encountered by the shadowing process, it is bracketed. The brackets are closed when the corresponding "end" transaction is encountered. All of the transactions between the "begin" transaction and a later "end" transaction are saved until it is confirmed that every transaction in the bracketed chain completed successfully. If every transaction did not complete successfully, all of the transactions in the chain are rolled back. Retention of the appropriate log files facilitates rollback. Accordingly, the log files are accumulated, and as they are applied, a check is made for outstanding transactions. If there are no outstanding transactions associated with a log file, the log file is deleted. If there are outstanding transactions associated with the log file, the log file is saved.

Figure 12:
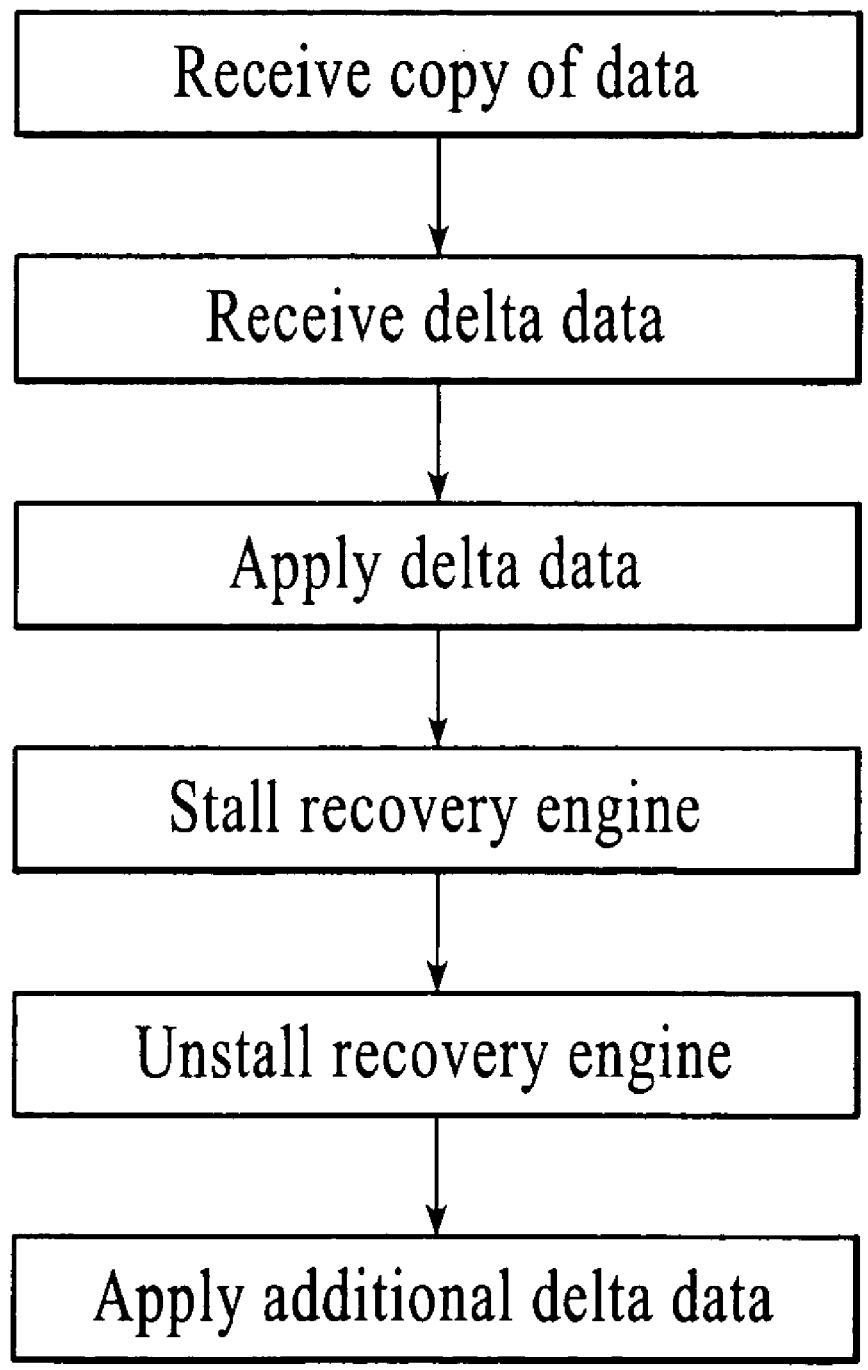
FIG. 12 is a flow diagram of a process of shadowing according to another embodiment.

FIG. 12 is a flow diagram of a process of shadowing according to another embodiment in which the a database recovery engine that is part of the production system is directed to a copy of the production data (which in this example is part of the "Jet Blue" Exchange™ database engine (an extensible storage engine (ESE)) is directed to the EDB and used to facilitate shadowing and log shipping. In an example, the database recovery engine is part of the Jet Blue Exchange™ database engine, but embodiments are not so limited. FIG. 12 illustrates an alternative to the method described with reference to FIG. 11 for preventing the EDB from entering a recovered state. FIG. 12 illustrates a continuous log apply process according to which the recovery engine is stalled in order to allow the engine to apply logs multiple times.

A production system includes a production database, such as an EDB, a production database application, such as Exchange™, and log files (or "logs"). A utility system includes a shadow database and multiple log files transferred from the production system. A copy of the production data is received by an embodiment of the utility system. Initially, a baseline copy of the entire production database file is received and stored in a shadow repository. As delta data is generated by the production system, the delta data is received by the utility system. Delta data is any data that records changes made to the database file. In an embodiment, the delta data is one or more log files. In an embodiment, the log files are shipped to a near line server of the utility system from a remote Exchange™ Server. In an embodiment, the frequency of log shipping is pre-defined by a schedule, but the frequency could be determined otherwise, such as by an administrator through a data management application, or the log shipping may be event-driven.

The delta data is applied to the copy using the recovery engine. In systems such as Exchange™ that do not have log shipping capability, after logs are applied, the state of the database being operated on is changed to disallow the further application of log files. In an embodiment, the copy is prevented from entering this state by stalling the recovery engine. When additional log files are ready to be applied, the recovery engine is unstalled, and the additional log files are applied.

A new set of log files is introduced into the shadowing process. One of the log files of the set is replicated and stored. The original copy of the replicated log file is then modified in such a as to manner to stall the recovery engine. There may several possible mechanisms for stalling the recovery engine. One example introduces an exception that occurs during access to the modified log file, which is caught and post-processed by the recovery engine application process.

The recovery engine is directed to resume applying logs from the most recent log application cycle. The Jet Blue engine may be running as part of a larger aggregate system, it may be running on its own, or it may only have essential components reconstituted so that the effect of the Jet Blue engine log application (e.g., recovery) is achieved. In addition it may be possible to have a replacement system that might replicate the necessary capabilities of the Jet Blue engine in order to accomplish the log application process.

The recovery engine applies the logs to the database until it encounters the modified log file, which stalls the Jet Blue engine. This prevents the database from entering a state in which no further logs can be applied.

The replicated log file is then substituted for the modified log file. At this point the shadowing process is ready for a subsequent set of log files and a consequent log application cycle. The process described above can be resumed and replayed every time a new set of logs is received from the production system.

The process illustrated in FIG. 12 is described in relationship to Microsoft Exchange™. However, the process is applicable to other messaging and collaboration servers. The process is also extensible to generic applications that use structured, semi-structured, or unstructured data. Though this example shows a production database or server, it is possible to provide equivalent services to multiple homogeneous or heterogeneous databases or servers. Similarly, though this example described a single shadow database, which in an embodiment includes a near line server, in various embodiments, the shadow database may be clustered, distributed, replicated, virtualized, and may straddle multiple machines or sites.

Figure 13:
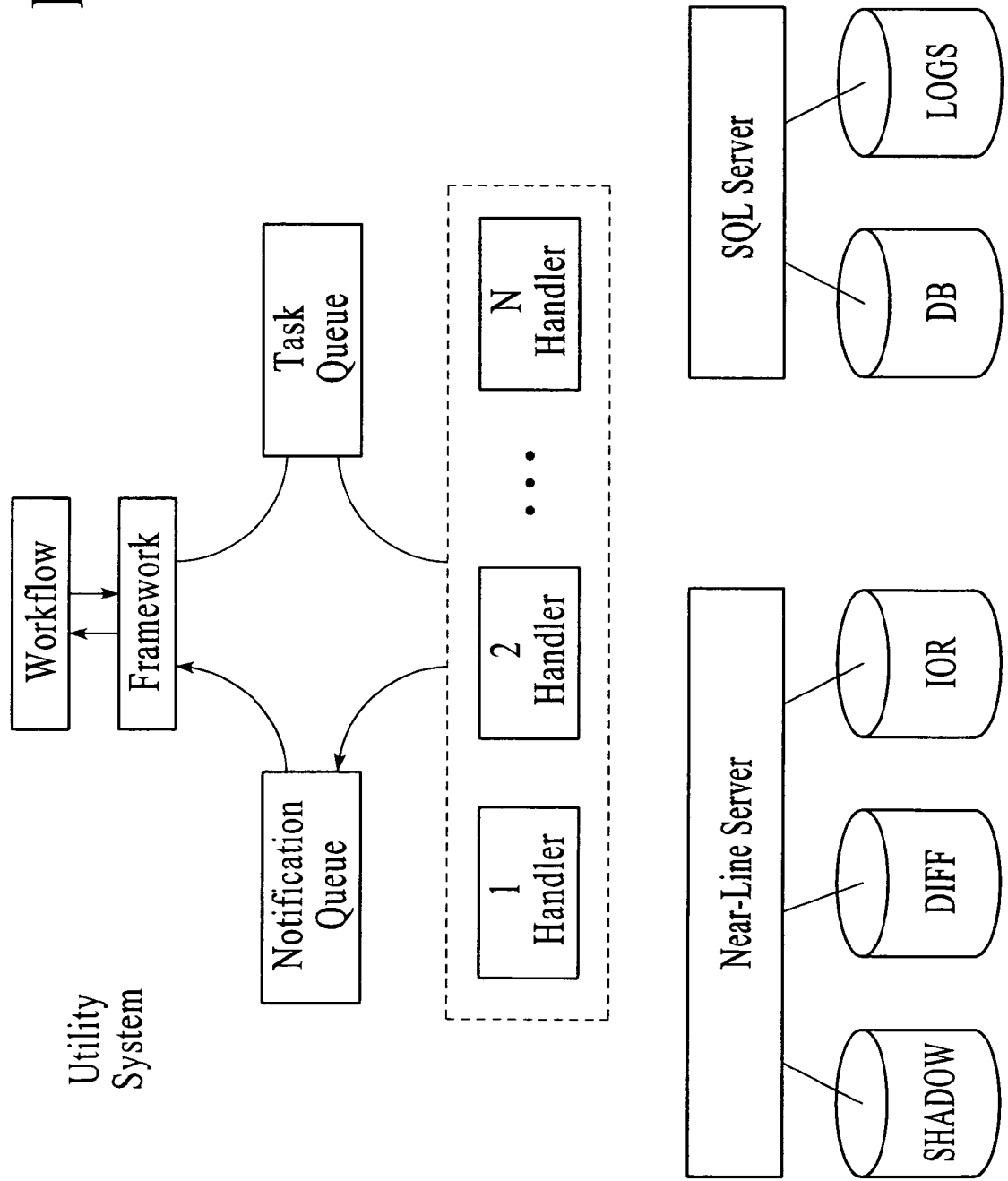
FIG. 13 is a block diagram of a utility system architecture having the data surrogation capabilities described herein, according to an embodiment.

FIG. 13 is a block diagram of a utility system architecture having the data surrogation capabilities described herein, according to an embodiment. The utility system includes one or more near-line servers (one is shown for convenience) which communicate with a shadow database, a diff database, and an indexed object repository (IOR) database. The utility system further includes one or more SQL servers. An SQL server is a relational database management system (RDBMS) produced by Microsoft. Its primary query language is Trans-act-SQL, an implementation of the ANSI/ISO standard Structured Query Language (SQL). Other RDBMSs can also be used. Also, more than one SQL server may be used. The SQL server communicates with an SQL database and a log database that stores log files.

The utility system further includes a framework, multiple handlers, and queues (for example, a notification queue and a task queue are shown). The utility system further includes a workflow. In an embodiment, the utility system receives a request. Examples of a request include a timer being activated, or a user or administrator making a request. The request manifests itself as a notification, which is placed in the notification queue. The framework grabs the notification from the notification queue and looks it up in the workflow to determine how to handle the particular notification. The framework looks up the workflow and then calls the appropriate handler depending on what it learned from the workflow. The framework places the notification in the task queue. The handler takes the notification from the task queue and proceeds to handle it as appropriate.

The framework determines whether the request has been successfully handled, and determines what to do next. The framework looks to the workflow to get the next notification and call the next handler, and the process continues. This architecture allows "hot code load". For example, in an embodiment, the utility system software code, including the code related to the data surrogation capabilities described herein, is written in the form of handlers. This is advantageous, especially in the situation of a system in the field, because the system can be easily updated by simply installing one or more new handlers. If there are any issues with a new handler, the new handler can be discarded in favor of the handler it was meant to replace.

Many variations of retrofitting synthetic full copies are contemplated to be within the scope of the claimed invention. In various embodiments, log shipping is dynamic, in that log files are transferred to the utility system as they are generated and applied as they are generated. This is in contrast to prior systems in which the log files are accumulated and only applied, for example, in the case of a failure of the production server. Dynamic log shipping and application in various embodiments is event driven or occurs according to a predefined schedule. Dynamic log shipping provides a further improvement of the recovery point objective (RPO). In one embodiment of dynamic log shipping, the data surrogation or shadowing process receives a notification whenever a new log file is filled up in the production server. The new log file is then transferred to the utility system for subsequent application. The RPO is optimized because in case of a catastrophic failure in Exchange that results in all logs being lost on the production server, the window of data loss is bracketed by the content of a single or partial log file.

In an embodiment, shadowing includes monitoring. For example, a change to the production data is detected and a notification is issued, causing the notification to be handled. This may be accomplished in a manual manner through user intervention or alternatively through automatic notification. The automatic notification may be event driven or it may be scheduled and batched in some manner.

The log transfer process is optional in situations where the shadowing or data surrogation mechanism is co-resident on the production system or server, hence allowing direct access to the production database and log files. This optional transfer may occur over some form of network or equivalent mechanism. This optional process may occur lazily, or eagerly, or in some batched combination.

In various embodiment, the availability of the shadow database to data management applications may be to the actual data that is being modified by the process, or it may be to a copy of that data, or it may be some combination thereof. This may be available in the form of an API or web service or equivalent.

In various embodiments, a log file that has been shipped to, or made available to, the data surrogation mechanism is immediately applied to the shadow database in order to bring it up-to-date. This lowers the utility or near-line window since changes that occur on the messaging server become more immediately visible on the near-line server. Other alternatives exist that might include batching the log files and then making decisions regarding batching and lazy application, perhaps for performance optimization of the utility or near-line server. In other embodiments, the logs are post-processed before they are applied, for example to filter for relevance, or to filter out undesirable content.

In yet other embodiments, log tailing is incorporated into the data surrogation or shadowing process. Dynamic log shipping brings down the RPO to the contents of a single log file, or less. Log tailing may also be used to further reduce the RPO down since the logs are being continually captured as they are written on the production messaging server and then shipped over and applied on the utility or near-line server. According to such embodiments, the modifications that are occurring to the current transaction log are being immediately captured and shipped over to the utility server for application. This could improve the maintenance of the data surrogate from near real-time to real-time. In one example the log files are propagated and applied asynchronously. Other alternatives are possible, such as synchronous application. In addition, rather than apply changes immediately on the utility server, it is possible to batch the changes and apply them lazily.

As individual transactions are being written to the write-ahead logs in the production server, they may be captured and transferred over to the near line server on the right and optionally reconstituted in an embodiment. The apply process as described herein may run on a schedule, be event driven, or run continuously. The apply process may optionally apply the transactions or the re-constituted logs to the shadow database to bring it up-to-date. In various embodiments, data management applications are concurrently able to access a recent copy of the shadow data.

The components of the multi-dimensional surrogation described above may include any collection of computing components and devices operating together. The components of the multi-dimensional surrogation can also be components or subsystems within a larger computer system or network. Components of the multi-dimensional surrogation can also be coupled among any number of components (not shown), for example other buses, controllers, memory devices, and data input/output (I/O) devices, in any number of combinations. Further, functions of the multi-dimensional surrogation can be distributed among any number/combination of other processor-based components.

The information management of an embodiment includes a method comprising receiving a copy of original data at a first server. The original data of an embodiment is stored at a second server. The method of an embodiment includes receiving delta data at the first server in a plurality of instances. The delta data of an embodiment includes information of changes to the original data. The method of an embodiment includes dynamically generating and maintaining an updated version of the copy at the first server by applying the delta data to the copy as the delta data is received.

The generating and maintaining of an embodiment is asynchronous with the receiving.

The applying of an embodiment is according to an interval. The interval of an embodiment is based on one or more of time and events at the second server.

The delta data of an embodiment includes data of an incremental difference between the original data at a plurality of instances.

The delta data of an embodiment includes data of a differential difference between the original data at a plurality of instances.

The method of an embodiment comprises controlling the applying using modified information of a component of the first server.

The component of an embodiment includes one or more of structural metadata of the copy and a log file of the delta data.

The method of an embodiment includes modifying the component.

The component of an embodiment is structural metadata of the copy. The modifying of an embodiment comprises detecting a first state of the copy, wherein the first state indicates the delta data has been applied to the copy. The modifying of an embodiment comprises changing the first state to a second state. The second state of an embodiment is a state from which another updated version can be generated by applying additional delta data to the updated version. Changing the first state to the second state of an embodiment includes modifying the structural metadata of the copy.

The component of an embodiment is a log file of a plurality of log files. The delta data a log file of a plurality of log files is a plurality of log files. The applying of an embodiment includes invoking an engine of the second server and the terminating includes stalling the engine.

The first server of an embodiment includes a near-line server and the second server includes a messaging and collaboration server.

The information management of an embodiment includes a method comprising receiving a plurality of delta data at a first server. The delta data of an embodiment includes information of changes to original data of a second server. The method of an embodiment includes dynamically generating and maintaining an updated version of a copy of the original data at the first server by applying at least one of the plurality of delta data to the copy. The method of an embodiment includes controlling the applying using modified information of a component of the first server.

The component of an embodiment includes structural metadata of the copy.

The component of an embodiment includes a log file of the delta data.

The method of an embodiment includes modifying the component.

The component of an embodiment is structural metadata of the copy. The modifying of an embodiment comprises detecting a first state of the copy. The first state of an embodiment indicates the delta data has been applied to the copy. The modifying of an embodiment comprises changing the first state to a second state. The second state of an embodiment is a state from which another updated version can be generated by applying additional delta data to the updated version. Changing the first state to the second state of an embodiment includes modifying the structural metadata of the copy. The additional delta data of an embodiment is received after generating the updated version.

The applying of an embodiment includes invoking an engine of the second server. The method of an embodiment includes causing the engine to reference a first unapplied log file of the delta data, wherein the first unapplied log file is a first log file unapplied to the copy.

The delta data of an embodiment is a plurality of log files. The component of an embodiment is a log file of the plurality of log files. The terminating of an embodiment comprises replacing the modified log file with the replicated log file. The applying of an embodiment includes invoking an engine of the second server and the terminating includes stalling the engine.

The method of an embodiment includes receiving at the first server a copy of the original data from the second server. The copy of an embodiment is a full copy. The copy of an embodiment is an incremental copy.

The method of an embodiment includes transferring the updated version to an indexed object repository.

The generating of an embodiment is in response to at least one of an automatic trigger, a timer notification, an event notification, a poll, and a request.

The automatic trigger of an embodiment includes a trigger automatically initiated in response to at least one pre-specified parameter. The automatic trigger of an embodiment includes content of the updated version.

The timer notification of an embodiment includes notifications corresponding to scheduled events including at least one of maintenance operations, user activities, server activities, and data population operations.

The event notification of an embodiment includes notifications corresponding to changes to data of the original data.

The request of an embodiment includes at least one of access attempts and configuration attempts to the original data by one or more of users of the second server, servers and applications.

The first server of an embodiment includes a near-line server.

The generating of an embodiment is in near real-time and maintains complete integrity and consistency of the original data.

The second server of an embodiment includes a messaging and collaboration server.

The original data of an embodiment includes one or more of application data, databases, storage groups, mailbox data, and server data.

The method of an embodiment includes maintaining the updated version. The maintaining of an embodiment includes generating another updated version by applying at least one set of log files to the updated version. The at least one set of log files of an embodiment is received later in time than the plurality of log files.

The second server of an embodiment includes one or more of local servers, remote servers, database servers, messaging servers, electronic mail servers, instant messaging servers, voice-over Internet Protocol servers, collaboration servers, Exchange Servers, portals, customer relationship management (CRM) servers, enterprise resource planning (ERP) servers, business-to-business servers, and content management servers.

The information management of an embodiment includes a method comprising receiving a copy of original data at a first server. The original data is stored at a second server. The method of an embodiment includes receiving a plurality of delta data at the first server. The delta data of an embodiment includes information of changes to the original data. The method of an embodiment includes dynamically generating and maintaining an updated version of the copy at the first server by applying at least one of the plurality of delta data to the copy. The method of an embodiment includes controlling the applying using modified information of a component of the first server.

The information management of an embodiment includes a computer readable medium including executable instructions which, when executed in a processing system, support near real-time data shadowing by receiving a plurality of delta data at a first server. The delta data of an embodiment includes information of changes to original data of a second server. The instructions of an embodiment when executed dynamically generate and maintain an updated version of a copy of the original data at the first server by applying at least one of the plurality of delta data to the copy. The instructions of an embodiment when executed control the applying using modified information of a component of the first server.

The component of an embodiment includes structural metadata of the copy.

The delta data of an embodiment comprises at least one log file, and the component of an embodiment includes one of the at least one log files.

The information management of an embodiment includes a system comprising a near-line server coupled to one or more servers that include original data. The system of an embodiment includes a shadowing system coupled to the near-line server and configured to receive a copy of the original data. The shadowing system of an embodiment is configured to receive delta data in a plurality of instances. The delta data of an embodiment includes information of changes to the original data. The shadowing system of an embodiment is configured to dynamically generate and maintain an updated version of the copy at the near-line server by applying the delta data to the copy as the delta data is received.

The shadowing system of an embodiment is configured to generate and maintain asynchronously.

The delta data of an embodiment includes data of an incremental difference between the original data at a plurality of instances.

The delta data of an embodiment includes data of a differential difference between the original data at a plurality of instances.

The shadowing system of an embodiment is configured to control the applying using modified information of a component of the near-line server.

The component of an embodiment includes one or more of structural metadata of the copy and a log file of the delta data.

The shadowing system of an embodiment is configured to modify the component.

The component of an embodiment is structural metadata of the copy.

The modifying of an embodiment comprises configured to detect a first state of the copy, wherein the first state indicates the delta data has been applied to the copy.

The modifying of an embodiment comprises configured to change the first state to a second state, wherein the second state is a state from which another updated version can be generated by applying additional delta data to the updated version.

Changing the first state to the second state of an embodiment includes modifying the structural metadata of the copy.

The delta data of an embodiment is a plurality of log files, wherein the component is a log file of a plurality of log files.

The applying of an embodiment includes invoking an engine of the one or more servers and the terminating includes stalling the engine.

The one or more servers of an embodiment include a messaging and collaboration server.

The information management of an embodiment includes a system comprising a near-line server coupled to one or more servers that include original data. The system of an embodiment includes a shadowing system coupled to the near-line server and configured to receive a copy of the original data. The shadowing system of an embodiment is configured to receive delta data that includes information of changes to the original data. The shadowing system of an embodiment is configured to dynamically generate and maintain an updated version of the copy at the near-line server by applying at least one of the plurality of delta data to the copy as the delta data is received. The shadowing system of an embodiment is configured to control the applying using modified information of a component of the near-line server.

The information management of an embodiment includes a system comprising a near-line server coupled to one or more servers. The system of an embodiment includes a shadowing system coupled to the near-line server and configured to receive delta data that describes incremental changes to original data of one or more servers. The shadowing system of an embodiment is configured to dynamically generate and maintain an updated version of a copy of the original data at the near-line server by applying at least one of the plurality of the delta data to the copy. The shadowing system of an embodiment is configured to control the applying using modified information of a component of the near-line server.

The component of an embodiment includes structural metadata of the copy.

The component of an embodiment includes a log file of the delta data.

The shadowing system of an embodiment is configured to modify the component.

The component of an embodiment is structural metadata of the copy.

Configured to modify of an embodiment comprises configured to detect a first state of the copy. The first state of an embodiment indicates the delta data has been applied to the copy.

Configured to modify of an embodiment comprises configured to change the first state to a second state. The second state of an embodiment is a state from which another updated version can be generated by applying additional delta data to the updated version.

Changing the first state to the second state of an embodiment includes modifying the structural metadata of the copy.

The additional delta data of an embodiment is received after generating the updated version.

The applying of an embodiment includes invoking an engine of the one or more servers.

The shadowing system of an embodiment is configured to cause the engine to reference a first unapplied log file of the delta data. The first unapplied log file of an embodiment is a first log file unapplied to the copy.

The delta data of an embodiment is a plurality of log files. The component of an embodiment is a log file of the plurality of log files.

The applying of an embodiment includes invoking an engine of the second server and the terminating includes stalling the engine.

The shadowing system of an embodiment is configured to receive the copy from the one or more servers.

The copy of an embodiment is a full copy.

The copy of an embodiment is an incremental copy.

The shadowing system of an embodiment is configured to transfer the updated version to an indexed object repository.

The shadowing system of an embodiment is configured to generate and maintain in response to at least one of an automatic trigger, a timer notification, an event notification, a poll, and a request.

The automatic trigger of an embodiment includes a trigger automatically initiated in response to at least one pre-specified parameter.

The automatic trigger of an embodiment includes content of the updated version.

The timer notification of an embodiment includes notifications corresponding to scheduled events including at least one of maintenance operations, user activities, server activities, and data population operations.

The event notification of an embodiment includes notifications corresponding to changes to data of the original data.

The request of an embodiment includes at least one of access attempts and configuration attempts to the original data by one or more of users of the second server, servers and applications.

The shadowing system of an embodiment is configured to generate and maintain in near real-time with complete integrity and consistency of the original data.

The one or more servers of an embodiment include a messaging and collaboration server.

The original data of an embodiment includes one or more of application data, databases, storage groups, mailbox data, and server data.

The shadowing system of an embodiment is configured to maintain the updated version by generating another updated version by applying at least one set of log files to the updated version, the at least one set of log files received later in time than the delta data.

The one or more servers of an embodiment include one or more of local servers, remote servers, database servers, messaging servers, electronic mail servers, instant messaging servers, voice-over Internet Protocol servers, collaboration servers, Exchange Servers, portals, customer relationship management (CRM) servers, enterprise resource planning (ERP) servers, business-to-business servers, and content management servers.

Aspects of the multi-dimensional surrogation described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the multi-dimensional surrogation include: microcontrollers with memory (such as electronically erasable programmable read only memory (EEPROM)), embedded microprocessors, firmware, software, etc. Furthermore, aspects of the multi-dimensional surrogation may be embodied in microprocessors having software-based circuit emulation, discrete logic (sequential and combinatorial), custom devices, fuzzy (neural) logic, quantum devices, and hybrids of any of the above device types. Any underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components of multi-dimensional surrogation disclosed herein may be described using data and/or instructions embodied in various computer-readable media. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the multi-dimensional surrogation may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the multi-dimensional surrogation is not intended to be exhaustive or to limit the multi-dimensional surrogation to the precise form disclosed. While specific embodiments of, and examples for, the multi-dimensional surrogation are described herein for illustrative purposes, various equivalent modifications are possible within the scope of the multi-dimensional surrogation, as those skilled in the relevant art will recognize. The teachings of the multi-dimensional surrogation provided herein can be applied to other processing systems and methods, not only for the systems and methods described above.

The elements and acts of the various embodiments described above can be combined to provide further embodiments. These and other changes can be made to the multi-dimensional surrogation and methods in light of the above detailed description.

In general, in the following claims, the terms used should not be construed to limit the multi-dimensional surrogation and methods to the specific embodiments disclosed in the specification and the claims, but should be construed to include all processing systems that operate under the claims. Accordingly, the multi-dimensional surrogation is not limited by the disclosure, but instead the scope of the multi-dimensional surrogation is to be determined entirely by the claims.

While certain aspects of the multi-dimensional surrogation are presented below in certain claim forms, the inventors contemplate the various aspects of the multi-dimensional surrogation in any number of claim forms. For example, while only one aspect of the multi-dimensional surrogation is recited as embodied in machine-readable media, other aspects may likewise be embodied in machine-readable media. Accordingly, the inventors reserve the right to add additional claims after filing the application to pursue such additional claim forms for other aspects of the multi-dimensional surrogation.

What is claimed is:

1. A system comprising:
   a near-line server coupled to one or more servers that include original data; and
   a shadowing system coupled to the near-line server and configured to:
      receive a copy of the original data;
      receive delta data in a plurality of instances, wherein the delta data includes data of an incremental and differential difference between the original data; and
      dynamically and continuously generate and maintain an updated version of the copy at the near-line server in near real time, wherein the generating and maintaining comprise the one or more servers writing ahead information to at least one log file in response to changes in state of the original data, the information including the delta data, the one or more servers shipping the at least one log file to the near-line server, and the near-line server receiving and applying the write-ahead logs in maintaining the updated version; and
      retrofit log shipping capability for application data and other structured and unstructured data based in part on the use of an override operation of an application state to allow log files to be applied as they are received, the override operation used in part to prevent a component of the near line server from entering the application state in which no further log files can be applied.

2. The system of claim 1, wherein the shadowing system is configured to generate and maintain asynchronously.

3. The system of claim 1, wherein the shadowing system is configured to control the applying using modified information of the component of the near-line server.

4. The system of claim 3, wherein the component includes one or more of structural metadata of the copy and a log file of the delta data.

5. The system of claim 4, wherein the delta data is a plurality of log files, wherein the component is a log file of a plurality of log files.

6. The system of claim 5, wherein the applying includes invoking an engine of the one or more servers and terminating the applying includes stalling the engine.

7. The system of claim 3, wherein the shadowing system is configured to modify the component.

8. The system of claim 7, wherein the component is structural metadata of the copy.

9. The system of claim 7, wherein configured to modify comprises configured to detect a first state of the copy, wherein the first state indicates the delta data has been applied to the copy.

10. The system of claim 9, wherein configured to modify comprises configured to change the first state to a second state, wherein the second state is a state from which another updated version can be generated by applying additional delta data to the updated version.

11. The system of claim 10, wherein changing the first state to the second state includes modifying the structural metadata of the copy.

12. The system of claim 1, wherein the one or more servers include a messaging and collaboration server.

13. A system comprising:
a near-line server coupled to one or more servers; and
a shadowing system coupled to the near-line server and configured to:
receive delta data that describes at least one of an incremental and differential change to original data of one or more servers;
dynamically and continuously generate and maintain an updated version of a copy of the original data at the near-line server, wherein the generating and maintaining comprise the one or more servers writing ahead information to at least one log file in response to changes in state of the original data, the information including the delta data, the one or more servers shipping the at least one log file to the near-line server, and the near-line server receiving and applying the write-ahead logs in maintaining the updated version; and
retro-fit log shipping capability for application data and other structured and unstructured data based in part on the use of an override operation of an application state to allow log files to be applied as they are received, the override operation used in part to prevent a component of the near-line server from entering the application state in which no further log files can be applied; and
control the applying using modified information of the component of the near-line server.

14. The system of claim 13, wherein the component includes structural metadata of the copy.

15. The system of claim 13, wherein the component includes a log file of the delta data.

16. The system of claim 13, wherein the shadowing system is configured to modify the component.

17. The system of claim 16, wherein the component is structural metadata of the copy.

18. The system of claim 16, wherein configured to modify comprises configured to detect a first state of the copy, wherein the first state indicates the delta data has been applied to the copy.

19. The system of claim 18, wherein configured to modify comprises configured to change the first state to a second state, wherein the second state is a state from which another updated version can be generated by applying additional delta data to the updated version.

20. The system of claim 19, wherein changing the first state to the second state includes modifying the structural metadata of the copy.

21. The system of claim 19, wherein the additional delta data is received after generating the updated version.

22. The system of claim 16, wherein the applying includes invoking an engine of the one or more servers.

23. The system of claim 22, wherein the shadowing system is configured to cause the engine to reference a first unapplied log file of the delta data, wherein the first unapplied log file is a first log file unapplied to the copy.

24. The system of claim 16, wherein the delta data is a plurality of log files, wherein the component is a log file of the plurality of log files.

25. The system of claim 24, wherein the shadowing system is configured to identify a selected log file of the plurality of log files and replicate the selected log file to form a replicated log file.

26. The system of claim 25, wherein the selected log file is a last-received log file.

27. The system of claim 25, wherein the shadowing system is configured to generate a modified log file by modifying information of the selected log file.

28. The system of claim 27, wherein the applying comprises:
applying log files of the plurality of log files in sequence; and
terminating the applying in response to encountering the modified log file.

29. The system of claim 28, wherein the terminating comprises replacing the modified log file with the replicated log file.

30. The system of claim 28, wherein the applying includes invoking an engine of a second server and the terminating the applying includes stalling the engine.

31. The system of claim 13, wherein the shadowing system is configured to receive the copy from the one or more servers.

32. The system of claim 31, wherein the copy is a full copy.

33. The system of claim 31, wherein the copy is an incremental copy.

34. The system of claim 13, wherein the shadowing system is configured to transfer the updated version to an indexed object repository.

35. The system of claim 13, wherein the shadowing system is configured to generate and maintain in response to at least one of an automatic trigger, a timer notification, an event notification, a poll, and a request.

36. The system of claim 35, wherein the automatic trigger includes a trigger automatically initiated in response to at least one pre-specified parameter.

37. The system of claim 36, wherein the automatic trigger includes content of the updated version.

38. The system of claim 35, wherein the timer notification includes notifications corresponding to scheduled events including at least one of maintenance operations, user activities, server activities, and data population operations.

39. The system of claim 35, wherein the event notification includes notifications corresponding to changes to data of the original data.

40. The system of claim 35, wherein the request includes at least one of access attempts and configuration attempts to the original data by one or more of users of a second server, servers and applications.

41. The system of claim 13, wherein the shadowing system is configured to generate and maintain the updated version with complete integrity and consistency of the original data.

42. The system of claim 13, wherein the one or more servers include a messaging and collaboration server.

43. The system of claim 13, wherein the original data includes one or more of application data, databases, storage groups, mailbox data, and server data.

44. The system of claim 13, wherein the shadowing system is configured to maintain the updated version by generating another updated version by applying at least one set of log files to the updated version, the at least one set of log files received later in time than the delta data.

45. The system of claim 13, wherein the one or more servers include one or more of local servers, remote servers, database servers, messaging servers, electronic mail servers, instant messaging servers, voice-over Internet Protocol servers, collaboration servers, Exchange Servers, portals, customer relationship management (CRM) servers, enterprise resource planning (ERP) servers, business-to-business servers, and content management servers.

46. A system comprising:
   one or more near-line servers coupled to one or more servers; and
   a shadowing system coupled to one or more of the near-line servers and configured to:
      dynamically and continuously generate and maintain an updated version of application data at the one or more near-line servers, wherein the generating and maintaining comprise the one or more servers writing ahead information to at least one log file, the information comprising delta data that includes at least one of an incremental and differential change in state of the original data, the one or more servers shipping the at least one log file to the one or more near-line servers, and the one or more near-line servers receiving and applying the write-ahead logs in maintaining the updated version; and
   retro-fit log shipping capability for application data and other structured and unstructured data based in part on use of an override operation of an application state to allow log files to be applied as they are received, the override operation to prevent a component of the one or more near-line servers from entering the application state in which no further log files can be applied;
   replicate one or more of the log files associated with the delta data to form one or more replicated log files; and
   generate one or more modified log files by modifying information of one or more of the log files.

\* \* \* \* \*